United States Patent
Singh et al.

(10) Patent No.: US 11,784,940 B2
(45) Date of Patent: Oct. 10, 2023

(54) DETECTING FAULTY RESOURCES OF A RESOURCE DELIVERY SYSTEM

(71) Applicant: Citrix Systems, Inc., Fort Lauderdale, FL (US)

(72) Inventors: Vikramjeet Singh, Bangalore (IN); William Thomas Georg Charnell, Buckinghamshire (GB); Priyanka Somashekar, Bangalore (IN)

( * ) Notice: Subject to any disclaimer, the term of this patent is extended or adjusted under 35 U.S.C. 154(b) by 440 days.

(21) Appl. No.: 16/927,075

(22) Filed: Jul. 13, 2020

(65) Prior Publication Data

US 2021/0367901 A1   Nov. 25, 2021

(30) Foreign Application Priority Data

May 22, 2020 (IN) .............................. 202011021603

(51) Int. Cl.
*H04L 47/74* (2022.01)
*H04L 47/78* (2022.01)
(Continued)

(52) U.S. Cl.
CPC ............ *H04L 47/746* (2013.01); *G06F 9/505* (2013.01); *G06F 9/5083* (2013.01); *G06F 11/00* (2013.01);
(Continued)

(58) Field of Classification Search
CPC ........ G06F 9/505; G06F 9/5083; G06F 11/00; G06F 11/3006; G06F 11/3055; G06F 2201/815; H04L 41/0627; H04L 41/0672; H04L 43/0817; H04L 43/0823; H04L 47/746; H04L 47/781

See application file for complete search history.

(56) References Cited

U.S. PATENT DOCUMENTS 8,516,106 B2 * 8/2013 Augenstein ......... G06F 11/3466 709/224
10,313,441 B2 * 6/2019 Moiyallah, Jr. ..... H04L 67/1097
(Continued)

OTHER PUBLICATIONS

"XenApp and XenDesktop 7.15 LTSR: Technical overview", Citrix Product Documentation, Jul. 23, 2018, https://docs.citrix.com/en-us/xenapp-and-xendesktop/7-15-ltsr/technical-overview.html.
(Continued)

*Primary Examiner* — Thomas J Dailey

(57) ABSTRACT

One example disclosed method involves a computing system determining that a first shared computing resource, included among a plurality of shared computing resources managed by a controller, is potentially faulty. The system may configure the controller to identify the first shared computing resource with a tag, the tag configured to cause the controller, in response to a client requesting the controller for access to a first application, to assign the first shared computing resource to deliver the first application to the client. The system may instruct the client to request the controller for access to the first application. The system may determine that the first shared computing resource is faulty based on the client being unable to access the first application at a time of application of the tag to the first shared computing resource. The system may take a corrective action with respect to the first shared computing resource.

14 Claims, 17 Drawing Sheets

(51) Int. Cl.
  *G06F 9/50* (2006.01)
  *H04L 43/0823* (2022.01)
  *H04L 41/0604* (2022.01)
  *G06F 11/00* (2006.01)
  *H04L 43/0817* (2022.01)
  *G06F 11/30* (2006.01)
  *H04L 41/0659* (2022.01)

(52) U.S. Cl.
  CPC ...... *G06F 11/3006* (2013.01); *G06F 11/3055* (2013.01); *H04L 41/0627* (2013.01); *H04L 41/0661* (2023.05); *H04L 43/0817* (2013.01); *H04L 43/0823* (2013.01); *H04L 47/781* (2013.01); *G06F 2201/815* (2013.01)

(56) References Cited

U.S. PATENT DOCUMENTS

| | | | | |
|---|---|---|---|---|
| 11,645,131 | B2* | 5/2023 | Monk | H04L 41/065 714/57 |
| 2011/0314331 | A1* | 12/2011 | Beach | G06F 11/079 714/E11.029 |
| 2017/0024312 | A1* | 1/2017 | Salame | G06F 11/263 |
| 2017/0168914 | A1 | 6/2017 | Altman et al. | |
| 2019/0065258 | A1* | 2/2019 | Irudayaraj | G06F 16/24539 |

OTHER PUBLICATIONS

"Citrix Virtual Apps and Desktops Current Release: Technical overview", Citrix Product Documentation, Feb. 14, 2020, https://docs.citrix.com/en-us/citrix-virtual-apps-desktops/technical-overview.html.

"Citrix Virtual Apps and Desktops service", Citrix Product Documentation, Feb. 5, 2020, https://docs.citrix.com/en-us/citrix-virtual-apps-desktops-service.html.

"XenApp and XenDesktop 7.15 LTSR: Create Application Groups", Citrix Product Documentation, Jul. 17, 2018, https://docs.citrix.com/en-us/xenapp-and-xendesktop/7-15-ltsr/install-configure/application-groups-create.html.

"Citrix Virtual Apps and Desktops Current Release: Tags", Citrix Product Documentation, Jan. 14, 2020, https://docs.citrix.com/en-us/citrix-virtual-apps-desktops/manage-deployment/tags.html.

"Monitor: Application probing", Citrix Product Documentation, Jan. 29, 2020, https://docs.citrix.com/en-us/citrix-virtual-apps-desktops-service/monitor/troubleshoot-deployments/applications/app-probing.html.

* cited by examiner

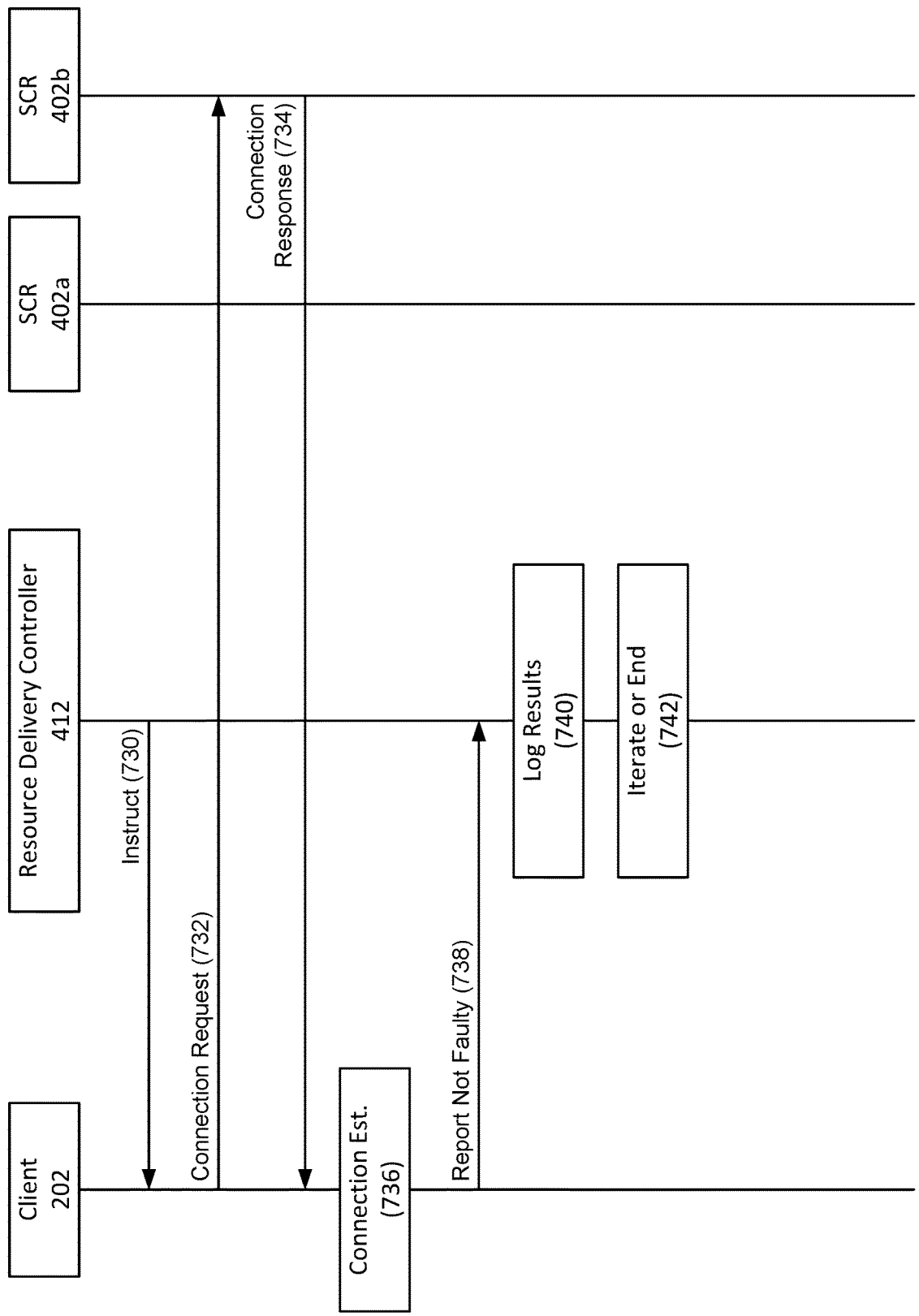

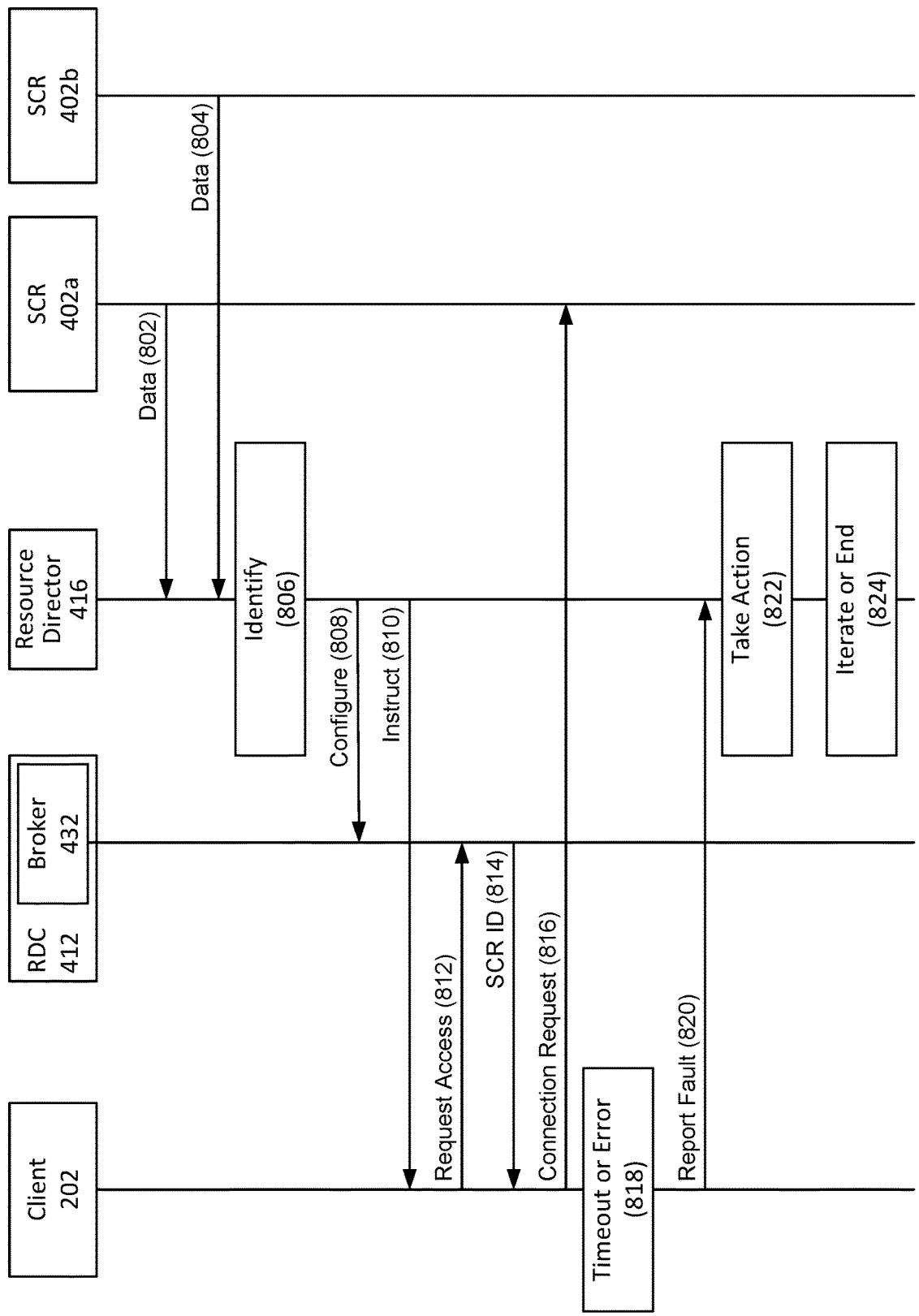

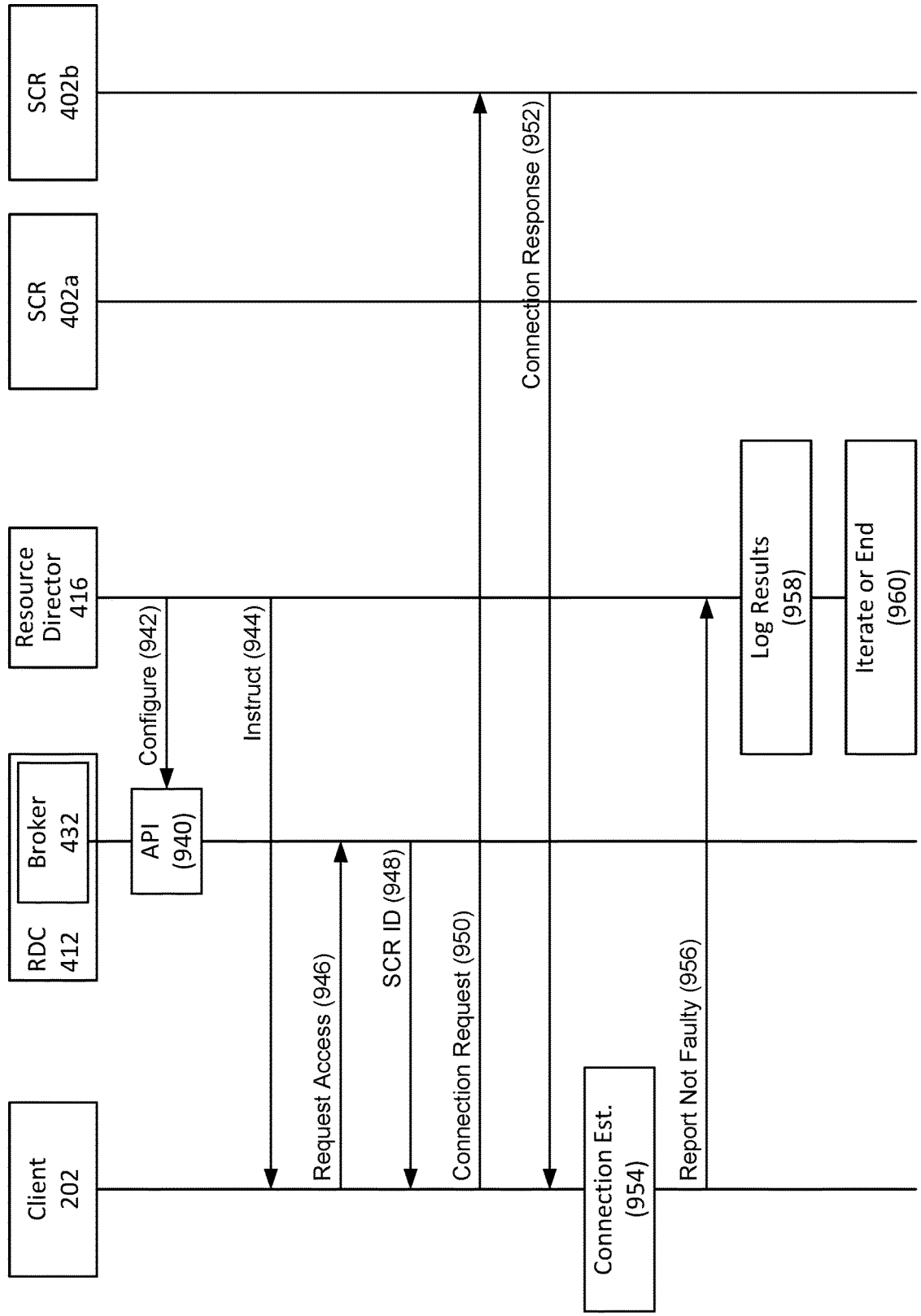

DETECTING FAULTY RESOURCES OF A RESOURCE DELIVERY SYSTEM

CROSS-REFERENCE TO RELATED APPLICATIONS

This application claims priority under 35 U.S.C. § 119(a) to Provisional Application No. 202011021603, entitled DETECTING FAULTY RESOURCES OF A RESOURCE DELIVERY SYSTEM, which was filed with the Indian Patent Office on May 22, 2020, the entire contents of which are incorporated herein by reference for all purposes.

BACKGROUND

Various systems have been developed that allow client devices to access applications over a network. The Virtual Apps and Desktops™ systems offered by Citrix Systems, Inc., of Fort Lauderdale, Fla., provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, at least one computing device performs a method involving determining, by a computing system, that at least a first shared computing resource, included among a plurality of shared computing resources managed by a controller, is potentially faulty. The method involves configuring, by the computing system, the controller to identify the first shared computing resource with a tag, the tag configured to cause the controller, in response to a client device requesting the controller for access to a first application, to assign the first shared computing resource to deliver the first application to the client device. The method involves instructing, by the computing system, the client device to request the controller for access to the first application. The method involves determining, by the computing system, that the first shared computing resource is faulty based on the client device being unable to access the first application at a time of application of the tag to the first shared computing resource. The method involves taking a corrective action with respect to the first shared computing resource.

In other disclosed embodiments, a computing system includes at least one processor and at least one computer-readable medium. The computer-readable medium may be encoded with instructions which, when executed by the at least one processor, cause the computing system to determine that at least a first shared computing resource managed by a controller is potentially faulty. The instructions may cause the computing system to configuring the controller to associate a client device and a first group of one or more applications so that controller is permitted to assign at least one shared computing resource to deliver the one or more applications in the first group, including at least a first application, to the client device. The instructions may cause the computing system to configure the controller to identify the first group of one or more applications with a tag. The instructions may cause the computing system to configure the controller to identify the first shared computing resource with the tag, the tag configured to indicate that the controller is permitted to assign the first shared computing resource to deliver the one or more applications in the first group to the client device. The instructions may cause the computing system to instruct the client device to request the controller for access to the first application. The instructions may cause the computing system to determine that the first shared computing resource is faulty based on the client device being unable to access the first application at a time of application of the tag to the first shared computing resource. The instructions may cause the computing system to take a corrective action with respect to the first shared computing resource.

In other disclosed embodiments, at least one computing device performs a method involving identifying, by a computing system, a shared computing resource based on a state of the shared computing resource, the state being indicative of an availability of the shared computing resource to connect with a client device. The method involves determining, by the computing system, an amount of time in which the shared computing resource has been in that state. The method involves providing, by the computing system, instructions to the client device to connect with the shared computing resource based on the determined amount of time in which the shared computing resource has been in the state. The method involves initiating, by the computing system, an action relative to the shared computing resource in response to input from the client device, the input indicative of the shared computing resource being inoperative, and the action configured to make the shared computing resource operative.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIGS. 7A and 7B show an example signal diagram according to a first example implementation of the resource delivery system shown in FIG. 6;

FIGS. 8A and 8B show an example signal diagram according to a second example implementation of the resource delivery system shown in FIG. 6; and FIGS. 9A and 9B show an example signal diagram according to a third example implementation of the resource delivery system shown in FIG. 6.

DETAILED DESCRIPTION

Figure 1:
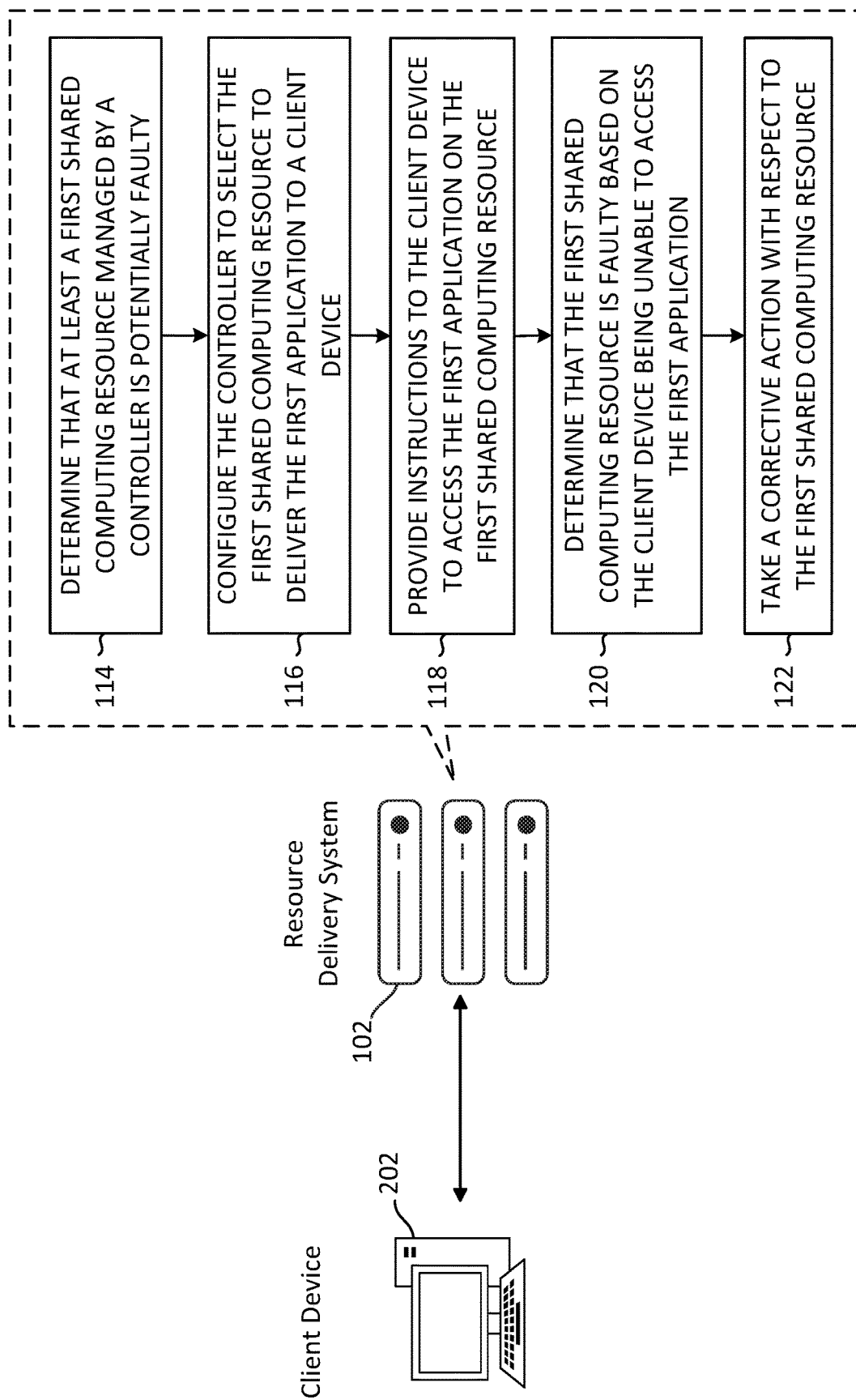
FIG. 1 is a diagram illustrating certain features of an example of a resource delivery system configured to detect faulty resources using targeted application probing in accordance with some embodiments of the present disclosure.

For purposes of reading the description of the various embodiments below, the following descriptions of the sections of the specification and their respective contents may be helpful:

Section A provides an introduction to example embodiments of a resource delivery system configured to detect faulty resources using targeted application probing;

Section B describes a network environment which may be useful for practicing embodiments described herein;

Section C describes a computing system which may be useful for practicing embodiments described herein;

Section D describes an example implementation of a resource delivery system which may be useful for practicing embodiments described herein;

Section E describes an example architecture of a resource virtualization server;

Section F provides a more detailed description of example embodiments of a resource delivery system configured to detect faulty resources using targeted application probing that were introduced above in Section A;

Section F describes example implementations of methods, systems/devices, and computer-readable media in accordance with the present disclosure.

A. Introduction to Illustrative Embodiments of a Resource Delivery System Configured to Detect Faulty Resources Using Targeted Application Probing In a typical resource delivery system, a resource delivery controller may selectively pair client devices with shared computing resources that can be configured to deliver applications and/or desktops to the client devices. In particular, the resource delivery controller may cause resource delivery agents of the shared computing resources to establish communication channels between the remote computing resources and the client devices, thus allowing the delivery of such applications and/or desktops via such communication channels. An example implementation of such a resource delivery system is described in Section D below in connection with FIGS. 4A-4F.

With such resource delivery systems, circumstances may arise in which a particular shared computing resources appears online to the resource delivery controller, but fails to respond to connection requests from client devices. The failure could be caused by any of a number of reasons, including a missing remote desktop protocol license, a lack of disk space, a bad DNS setting, a firewall setting, a network issue, etc. As a result, the resource delivery controller may continue to instruct clients to connect to the faulty resource. Further, because the faulty resource appears healthy and unloaded, load balancing components of the resource delivery system may interpret this to mean that the faulty resource has a greater availability than other resources that are fully functional. Thus the faulty resource may tend to attract many incoming connections, which can exacerbate the problem. Accordingly, more and more incoming connections may continue to fail, resulting in a poor experience for a significant number of users. In other words, the faulty resource acts as a "black hole," attracting connections that it cannot service.

Repairing a shared computing resource typically requires only a reboot. Without visibility over which shared computing resource has become faulty, however, the resource delivery controller is unable to identify which shared computing resource(s) to reboot. The shared computing resources could be probed, in turn, but a customer could have thousands of shared computing resources running at a given time making such a solution impractical. Probing all of the shared computing resource for a customer may also take hours to finish and report, during which many users may continue experiencing failures. And rebooting all shared computing resources for one user would disrupt every other user. The problem of shared resource black holes, as well as the challenge of efficiently detecting and repairing them, have plagued resource delivery systems for some time. It would thus be beneficial to have a mechanism to target and probe specific shared computing resources.

Offered is a system that is capable of detecting faulty shared computing resources using targeted probing. In some implementations, a resource director application can facilitate certain administrative functions with respect to the resource delivery system. The resource director, described further below in Section D, may generate a list of shared computing resources (e.g., target resources) for probing. The resource director may then configure the resource delivery controller (also described below in Section D) and one or more client devices (which can act as "fake" users) to attempt to connect to a target shared computing resource in the list, rather than a shared computing resource assigned based on perceived availability and/or load. The resource director may iterate through the list of target shared computing resources, configuring the resource delivery controller to direct the client device to attempt to connect with the respective targets (e.g., one at a time). Any target shared computing resources that the client is unable to connect with may be determined to be faulty or otherwise not properly functioning. The resource delivery controller may take corrective action to restore service to the faulty shared computing resources by, for example, repairing or rebooting them.

The resource director may generate the list of target shared computing resources in any of numerous ways. In some implementations, for example, the resource director may maintain a list of active shared computing resources along with one or more statistics such as CPU load (current, average, or recent average), how long it has been available, how long since the last successful connection, etc. In some implementations, the resource director may receive an operation status or health data directly from the shared computing resources by way of a script or health agent that executes on the shared computing resource and reports health statistics back to the resource director.

The resource director and resource delivery controller may use one or more clients to probe respective shared computing resources in the list of target shared computing resources. The clients may, for example, execute on a remote device and may be configured to attempt to login to the virtual desktop environment using a probe agent and/or a resource access application in a manner similar to a typical user.

The resource director and resource delivery controller may cause the client to probe a particular shared computing resource using any of a number of techniques. In some implementations, for example, the resource director may use tags to filter the shared computing resources that the client might attempt to contact. Such a tag may, for example, be arbitrary strings assigned to shared computing resources, applications, desktops, Delivery Groups, and/or application groups. In some implementations, an "application group" may identify a particular grouping of applications that can be managed collectively in the same way as a single application. For example, one or more users may be authorized to access an application group and/or one or more settings may be applied to an application group in the same way that one or more users may be authorized to access a single application or that one or more settings may be applied to a single application. Application groups may thus simplify certain administration tasks by allowing administrators to collectively manage particular groupings of applications. Additionally, system administrators can specify "Delivery Groups" to define which users are authorized to access certain shared computing resources. The resource director may apply tags to the shared computing resources, applications, and/or application groups. A database in communication with the resource delivery controller may store information regarding the associations between user identifiers, tags, shared computing resources, applications, desktops, Delivery Groups, and/or application groups. Thus, when the resource delivery controller receives a connection request from a client, it may, based on appropriately assigned tags, assign a particular shared computing resource to handle the connection. In doing so, a broker component of the resource delivery controller may check the database for a tag matching the user identifier of the client, and may assign a shared computing resource having the tag specified in the database. In some implementations, the resource director may apply the tags to the application statically, and to the shared computing resources in the list of target shared computing resources dynamically, thus directing connection requests from the client to the target shared computing resources in the list in turn.

In some implementations, the resource delivery controller may additionally or alternatively be configured to expose an application programming interface (API) or other functionality of the broker component that allows the resource director to associate or otherwise assign a particular identifier (e.g., a user identifier associated with the client) with a particular shared computing resource. In this manner, the resource director may instruct the broker component to associate or assign the client's identifier with a new target shared computing resource from the list of target shared computing resources when the client requests access to a shared computing resource.

It should be appreciated that the shared computing resources to be evaluated need not be evaluated in a strictly serial manner. Rather, in some implementations, multiple probe agents and/or multiple client devices may be used to probe multiple shared computing resources during overlapping time frames.

FIG. 1 is a diagram illustrating certain features of an example of a resource delivery system 102 configured to detect faulty resources using targeted application probing in accordance with some embodiments of the present disclosure. Although the illustrated example shows the resource delivery system 102 as including three servers, it should be appreciated that the resource delivery system 102 may include any number of servers (including only a single server) as well as any number of additional or different components, such as one or more databases, other network components, etc. In some implementations, the resource delivery system 102 may provide a desktop and/or application virtualization service to a client device 202. Desktop virtualization is the concept of separating the logical desktop from the physical machine. For example, the resource delivery system 102 may host files and execute applications, and may provide an environment to the client device 202 that allows a user to access the files and applications as though they existed locally on the client device 202. The client device 202 may be a personal computer, a mobile device such as a tablet or mobile phone, or a thin client. The virtualized computing environment provided by the resource delivery system 102 may provide the client device 202 with services beyond its hardware capabilities, and/or provide secure access to the files and applications on the resource delivery system 102.

Figure 3:
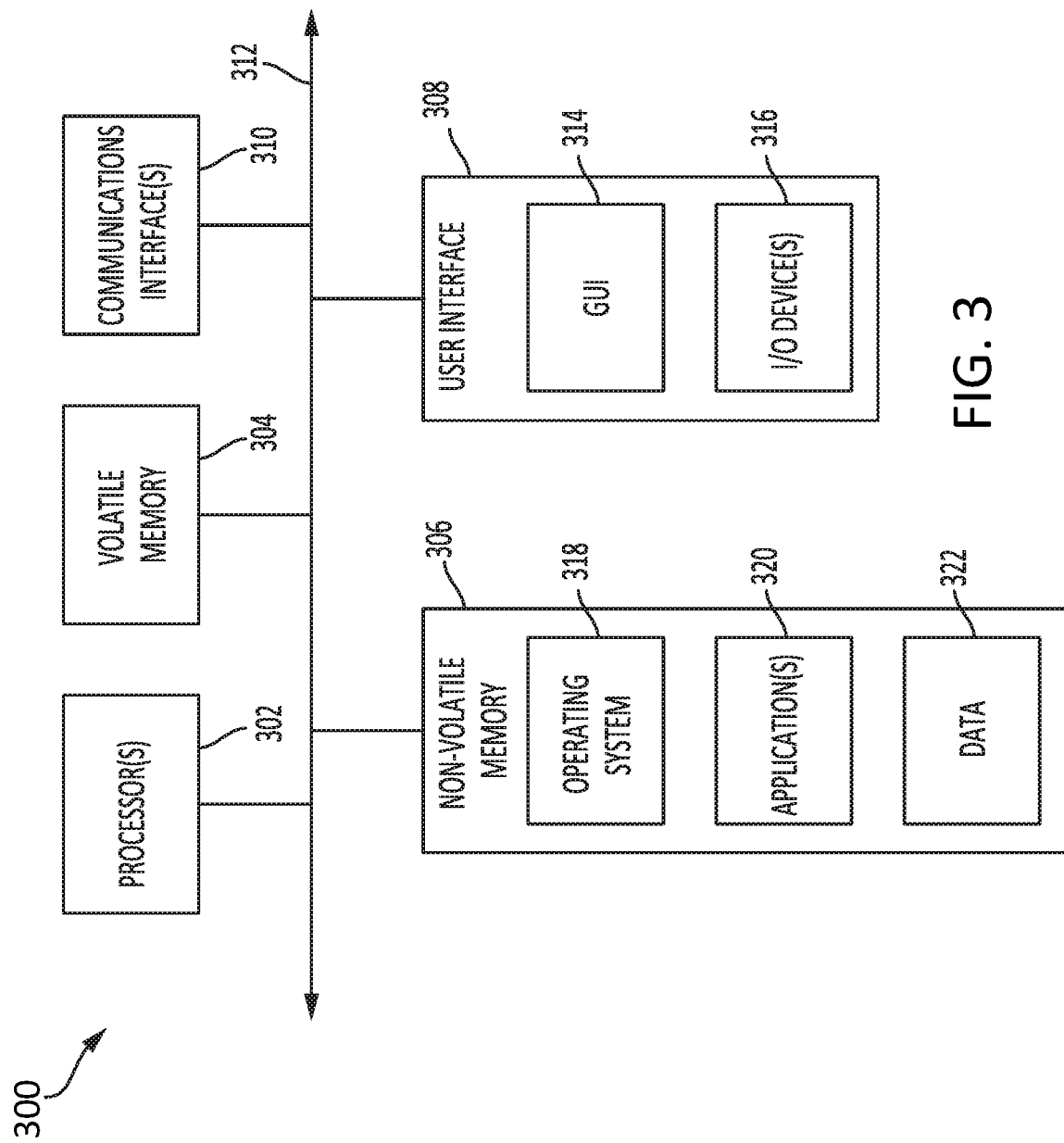
FIG. 3 is a block diagram of a computing system that may be used to implement one or more of the components of the computing environment shown in FIG. 2 in accordance with some embodiments.
Figure 4A:
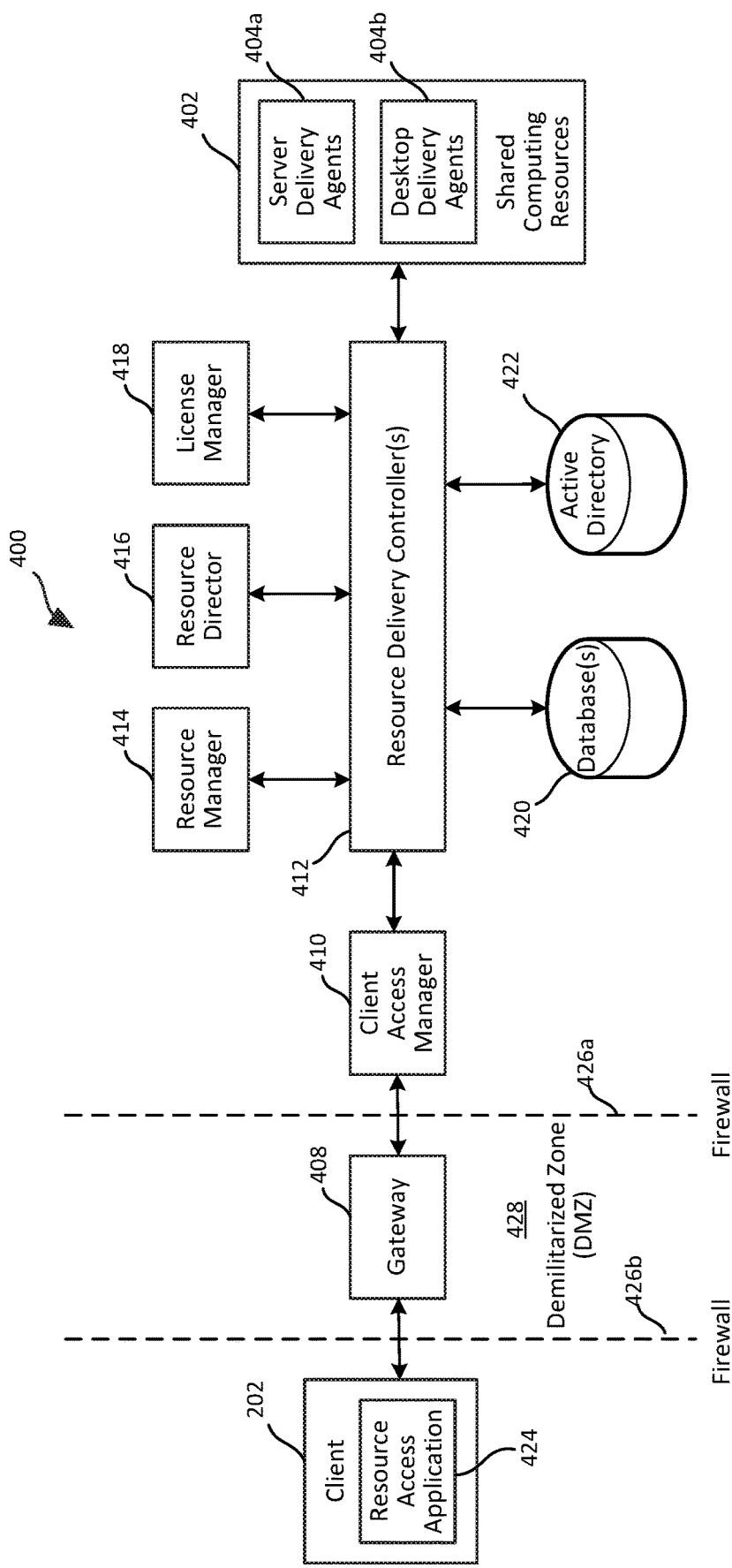
FIG. 4A is a block diagram illustrating key components of a resource delivery system which may be useful for practicing embodiments described herein.

In some implementations, the client device 202 may access services of the resource delivery system 102 using a resource access application 424, as shown in FIG. 4A and others. In other implementations, the client device 202 may additionally or alternatively execute a probe agent application, such as the probe agent 602 shown in FIG. 6. As explained in more detail below in Section F, the probe agent 602 may, under the direction of the resource delivery system 102, perform determine operational readiness or performance of individual shared computing resources of the resource delivery system 102. The probe agent 602 may perform such actions by itself or by directing functions of a resource access application 424. The resource delivery system 102 may include multiple integrated and/or interconnected components as described in FIGS. 2 through 6. For example, the resource delivery system 102 may be the same or similar as the resource delivery system 400 described in connection with FIGS. 4A-E, and may include a resource director 416, a resource delivery controller 412, a broker service 432, and one or more shared computing resources 402. Operations of the resource delivery system 102 are described below, and in further detail in Section F with reference to FIGS. 7 through 9.

As shown in FIG. 1, the resource delivery system 102 may, at a step 114, determine that at least a first shared computing resource managed by the controller is potentially faulty. The shared computing resources may include physical machines and/or virtual (e.g., hypervisor driven) machines, and may be located at a data center, within a cloud computing environment, or elsewhere. The shared computing resources may include one or more virtual machines. These can be virtual machines that are used to host applications and/or desktops, as well as virtual machines that are used to host the other components of the resource delivery system 102. The shared computing resources may be under the management of a resource delivery controller of the system 102. The resource delivery controller may communicate with the shared computing resources to distribute applications and/or desktops, authenticate and manage user access, broker connections between client devices 202 and resource delivery agents running on respective shared computing resources, optimize use connections, and/or load-balance use connections. A resource director of the system 102 may identify individual shared computing resources to include in the subset based on usage statistics in the form of an operational status or health statistics. Operational status or health statistics may be monitored and provided by, for example, one or more performance monitoring services or agents of the resource delivery controller and/or resource delivery agents. In some implementations, a monitor service of (or in communication with) the resource delivery controller (or resource director) may monitor certain operational statistics of the shared computing resources; for example and without limitation, an average CPU load for individual shared computing resources, a storage or memory usage for individual shared computing resources, and a time variable indicating a time that the shared computing resources have been available (i.e., how long it has indicated that it can accept new connections). In some cases, a faulty shared computing resource may appear available for a long time and/or show a low average CPU load due to an inability to respond to connection requests from client devices, whereas a functioning shared computing resource may exhibit a higher average CPU load due to effectively servicing client devices, and may appear unavailable at times when it is servicing a full complement of client devices. In some implementations, a monitor service associated with a shared computing resource may additionally or alternatively monitor an operational status including certain health-related statistics of the shared computing resource. This monitor service may be an application or a script that executes on the shared computing resource, and therefore may have more detailed information than that which is observable externally by the resource delivery controller. For example, a monitor service associated with the shared computing resource may be able to provide the resource director with information regarding a time elapsed since the last successful connection, a number of current connections, an average connection time, and/or connection error data. Based on the information collected, the resource director may compile the list of shared computing resources to be evaluated using the client device. In some implementations, the resource director may determine the list based on additional information about the shared computing resources; for example, based on relationships to, or commonalities with, another faulty shared computing resource. A faulty shared computing resource could be caused by any of a number of reasons, including a missing remote desktop protocol license, a lack of disk space, a bad DNS setting, a firewall setting, a network issue, etc. Based on knowledge of a faulty shared computing resource, whether or not the exact reason for the fault is known, the resource director may include in the list other shared computing resources that use the same or similar license, physical memory, network setting, etc. Once the resource director has compiled the list of shared computing resources that are to be evaluated using a client device, the resource director may configure the resource delivery controller and probe agent(s) to check them.

At a step 116, the resource director may configure the resource delivery controller such that, in response to a client device 202 requesting access to a first application during a first time frame, the resource delivery controller selects the first shared computing resource to attempt to deliver the first application to the client device 202. The resource director may configure the resource delivery controller such that, in response to the client device 202 requesting access to a particular application during a first time frame, the resource delivery controller selects a first shared computing resource included in the list to attempt to deliver that application to the client device 202. Thus, when the client device 202 requests access to the application during the first time frame, a broker component of the resource delivery controller may direct the client device 202 to connect to a particular shared computing resource in the list of shared computing resources to be evaluated. The resource director may configure the broker component to direct the client device 202 to the particular shared computing resource in any of a number of ways, such as by using an application programming interface (API) of the broker to pair a particular client device identifier with a particular shared computing resource identifier, or by using tag restriction features to control with client devices get paired with which shared computing resources.

In some implementations, the system 102 may employ tag restrictions to configure the broker to iteratively direct the client device 202 to the shared computing resources to be evaluated. The tag may be an arbitrary string assigned to an application (or list of applications), application groups, desktops, shared computing resources, and/or Delivery Groups in a database maintained by the resource delivery controller and accessible by the broker component. In some implementations, the resource director may apply the tags to the application (or application group) statically, and to the shared computing resources in the list of target shared computing resources (e.g., either as individual shared computing resources or by way of a Delivery Group) dynamically, thus directing connection requests from the client device 202 to the target shared computing resources in the list in turn. The resource director may, for example, send the broker component a tag for the purpose of associating the first application and the first shared computing resource. The broker may assign the tag to the first application and to the first shared computing resource. The assignments may be stored in a database associated with the broker component and/or resource delivery controller. The broker component may also store user permissions for applications, application groups, shared computing resources, and/or Delivery Groups; that is, individual users can be authorized for individual applications, etc. For example, clients may be identified based on an identifier. In some implementations, the identifier may be a unique Workspace user identifier assigned to the client or to a probe agent executing on the client. When the broker component receives a request for access to a shared computing resource, the broker component can, based on the identifier, determine that the client has authorization to access the requested application or application group. The broker component may further determine that a requested application, either individual or by virtue of inclusion in an application group, is associated with the tag. The broker component can determine that the tag represents a tag restriction specifying that the application should be executed on a particular shared computing resource (or a Delivery Group). As an alternative implementation, the resource director may, via the resource delivery controller, instead cause the client device 202 to include the tag in a first request for access. In any event, when the client device 202 requests access to the application, the broker may, based on the tag assignments, provide a shared computing resource consistent with the tag restriction; thus providing the client device 202 with the connection information to the first shared computing resource. The resource director may then update the configuration to iterate through the list of shared computing resources to be evaluated. Thus, following the first request for access, the resource director may configure the broker component to associate the tag with the first application and a second shared computing resource, and may cause the client device 202 to initiate a second request for access, and so on.

In some implementations, the broker component may alternatively expose an API that allows the resource director to pair a particular client device identifier with a particular shared computing resource identifier. Thus, in some implementations, configuring the resource delivery controller may include sending first data associating or otherwise identifying a client device identifier of the client device with a first shared computing resource identifier of the first shared computing resource. The resource director may update the configuration to iterate through the list of shared computing resources to be evaluated. Thus, following the first request for access, the resource director may configure the broker component to associate or otherwise identify the client device identifier with a second shared computing resource identifier of a second shared computing resource on the list, and so on.

Once a particular shared computing resource has been chosen for evaluation, the resource delivery system 102 may provide the information to the client device 202 and the shared computing resource to enable a direct connection. The operations for enabling the direct connection between the client device 202 and the shared computing resource are described below with reference to FIGS. 4A through 4F.

At a step 118, the resource delivery system 102 may provide instructions to the client device 202 to access the first application on the first shared computing resource. The resource director (in some implementations, via the resource delivery controller or some other mechanism of the system 102) may instruct the client device 202 to send a request to the system 102 for access to a particular application (or virtual desktop). The resource director may instruct the client device 202 to request access to the application while the broker component is configured, by one of the mechanisms described herein, to direct the client device 202 to connect to the first shared computing resource. Following the first request for access, the resource director may instruct the client device 202 to request access to the application again, such that the broker component directs the client device 202 to connect to the second shared computing resource on the list, and so on.

At a step 120, the resource delivery system 102 may determine that that the first shared computing resource is faulty based on the client device 202 being unable to access the first application. The resource director may, for example, receive information reported back from the client device 202 regarding the failed connection request and determine, based at least in part on the client device 202 being unable to access the first application, that the first shared computing resource is faulty. The attempt to access the first application may fail for one or more of several reasons. The client device 202 request may timeout; that is, the client device 202 may not receive a response from the shared computing resource within a certain amount of elapsed time following the request. Or the client device 202 may receive an error message from the shared computing resource. Such an error message may, for example, include an indication that a URL of the shared computing resource was not reachable, that the configured shared computing resource credentials are invalid, that the shared computing resource applications list does not contain the application requested, that an independent computing architecture (ICA) file is not available, that the application cannot be launched on the shared computing resource, etc. The client device 202 may, for example, report the fault back to the resource director. In the case of a successful connection, however, the client device 202 may instead report that the particular shared computing resource appears to be functional based on the client's ability to successfully access the application on the shared computing resource. In some implementations, the resource director may identify additional shared computing resources to be evaluated based on shared computing resources found to be faulty. The additional shared computing resources to be evaluated may be identified based on, for example, relationships to, or commonalities with, a faulty shared computing resource.

At a step 122, the resource delivery system 102 may take a corrective action with respect to the first shared computing resource. Based on the faults reported from the client device 202 (or client devices 202), the resource director may take one or more corrective actions. The resource director may, for example, notify an administrator of the faulty resources, log the faulty resources, and/or initiate repair or reboot operations with respect the faulty resources. The resource director may take corrective action with regard to a faulty shared computing resource immediately, or may wait until more resources in the list of resources to be evaluated have been probed.

Additional details and example implementations of embodiments of the present disclosure are set forth below in Sections F and G, following a description of example systems and network environments in which such embodiments may be deployed.

B. Network Environment

Figure 2:
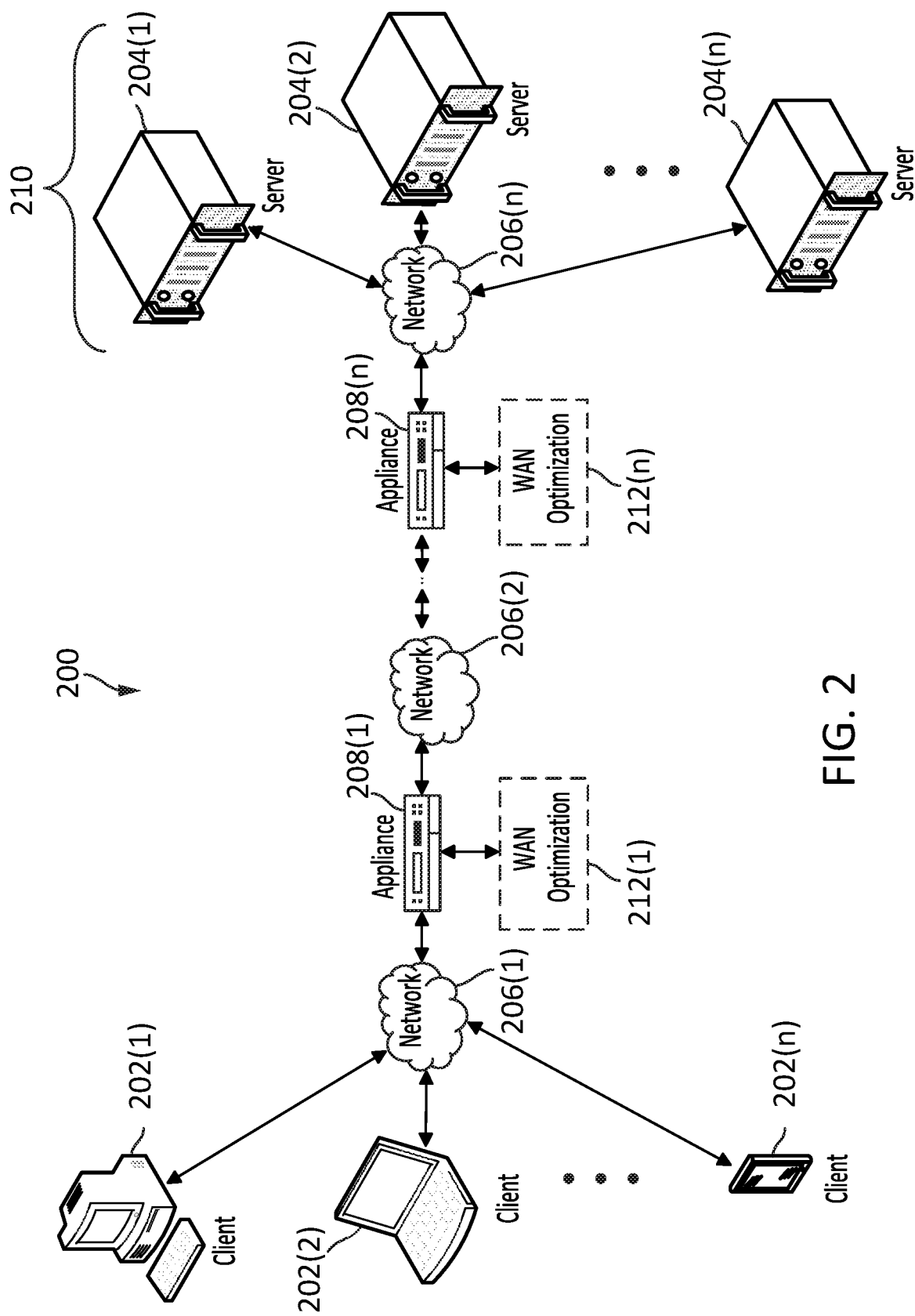
FIG. 2 is a diagram of a network environment in which some embodiments of the resource delivery system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

FIG. 3 illustrates an example of a computing system 300 that may be used to implement one or more of the respective components (e.g., the clients 202, the servers 204, and the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Virtualized Applications and/or Desktops to Client Devices FIG. 4A is a block diagram illustrating key components of a resource delivery system 400 that may enable a client device 202 to remotely access one or more virtual applications or desktops running on one or more shared computing resources 402. The shared computing resources 402 may include physical machines and/or virtual (e.g., hypervisor driven) machines, and may be located at a data center, within a cloud computing environment, or elsewhere. As described in more detail below, such shared computing resources 402 may implement one or more resource delivery agents 404, including one or more server delivery agents 404a and/or one or more desktop delivery agents 404b. The Virtual Delivery Agents (VDAs) of the Citrix Virtual Apps and Desktops™ system offered by Citrix Systems, Inc., of Fort Lauderdale, Fla., are example implementations of the resource delivery agents 404. In some implementations, the resource delivery system 400 may give an information technology (IT) department of an organization control of virtual machines, applications, licensing, and security while providing "anywhere access" for any device. As described below, the resource delivery system 400 may enable end users to run applications and/or desktops independently of the operating system and interface of the end user's device. Further, the resource delivery system 400 may enable administrators to manage the network and control access from selected devices or from all devices, as well as to manage an entire network from a single data center.

The resource delivery system 400 shown in FIG. 4A may, for example, correspond to an implementation of a Citrix Virtual Apps and Desktops™ system offered by Citrix Systems, Inc., of Fort Lauderdale, Fla. Such systems employ a unified architecture called FlexCast Management Architecture (FMA). Among other things, FMA provides the ability to run multiple versions of Citrix Virtual Apps or Citrix Virtual Desktops™ as well as integrated provisioning.

As shown in FIG. 4A, in addition to the shared computing resources 402, the resource delivery system 400 may include a gateway 408, a client access manager 410, one or more resource delivery controllers 412, a resource manager 414, a resource director 416, a license manager 418, one or more databases 420, and an Active Directory (AD) 422 or other directory service.

The resource delivery controller(s) 412 may be the central management component of the resource delivery system 400. In some implementations, the resource delivery controller(s) 412 may be installed on at least one server in a data center of an organization. The Delivery Controller of the Citrix Virtual Apps and Desktops™ system offered by Citrix Systems, Inc., of Fort Lauderdale, Fla., is one example implementation of the resource delivery controller(s) 412. For reliability and availability, respective resource delivery controllers 412 may be installed on multiple servers. The resource delivery controller(s) 412 may communicate with the shared computing resources 402 to distribute applications and/or desktops, authenticate and manage user access, broker connections between client devices 202 and resource delivery agents 404 running on respective shared computing resources 402, optimize use connections, and/or load-balance use connections. As described in more detail below, a broker service 432 (shown in FIGS. 4B-4D) of the resource delivery controller(s) 412 may interact with the database(s) 420 to track which users are logged on and where, what session resources the users have, and if users need to reconnect to existing applications. In some implementations, the broker service 432 may execute PowerShell commands and communicate with broker agents 456 (shown in FIG. 4D) of the resource delivery agents 404 over transmission control protocol (TCP) port "80." A monitor service 460 (shown in FIG. 4D) may also be provided by the resource delivery controller(s) 412 to collect historical data concerning the operation of the resource delivery controller(s) 412 and write such data to the database(s) 420. In some implementations, such a monitor service 460 may use TCP port "80" or "443."

The resource delivery controller(s) 412 may manage the state of desktops, starting and stopping them based on demand and administrative configuration. In some implementations, the resource delivery controller(s) 412 may also enable the adjustment of user profiles (stored within the database(s) 420) to manage user personalization settings in virtualized or physical Windows environments.

In some implementations, the database(s) 420 may include at least one Microsoft Structured Query Language (SQL) Server database in which configuration and session information may be stored. As noted above, the database(s) 420 may store the data collected and managed by the services that make up the resource delivery controller(s) 412. In some implementations, the database(s) 420 may be provided within a data center of an organization and may have a persistent connection to the resource delivery controller(s) 412. Although not illustrated in FIG. 4A, it should be appreciated that the resource delivery system 400 may also include respective databases associated with the resource manager 414, the resource director 416, and the license manager 418 to store data collected and/or used by those components.

The resource delivery agents 404 may be installed on physical or virtual machines that are made available to deliver applications or desktops to users. The resource delivery agents 404 may enable such machines to register with the resource delivery controller(s) 412. The registration of a machine with the resource delivery controller(s) 412 may cause that machine and the resources it is hosting to be made available to users. The resource delivery agents 404 may establish and manage the connections between the machines on which they are installed and client devices 202. The resource delivery agents 404 may also verify that a license is available for the user and/or session, and may apply policies that are configured for the session.

The resource delivery agents 404 may communicate session information to the broker service 432 (shown in FIGS. 4B-4D) of the resource delivery controller(s) 412 through the broker agents 456 (shown in FIG. 4D) in the resource delivery agents 404. Such broker agents 456 may host multiple plugins and collect real-time data. In some implementations, the broker agents 456 may communicate with the resource delivery controller(s) 412 over TCP port "80." In some implementations, the resource delivery agents 404 may operate with Single-session and/or Multi-session Windows operating systems. The resource delivery agents 404 for Multi-session Windows operating systems may allow multiple users to connect to the server at one time. The resource delivery agents 404 for Single-session Windows operating systems, on the other hand, may allow only one user to connect to the desktop at a time. In some implementations, one or more the resource delivery agents 404 may alternatively operate with a Linux operating system.

When users connect from outside one or more corporate firewalls, e.g., firewalls 426a and 426b shown in FIG. 4A, the gateway 408 may be used to secure such connections with Transport Layer Security (TLS). The gateway 408 may, for example, be a Secure Socket Layer (SLL) Virtual Private Network (VPN) appliance that is deployed in a demilitarized zone (DMZ) 428. The gateway 408 may thus provide a single secure point of access through the corporate firewall 426.

The client access manager 410 of the resource delivery system 400 may authenticate users and manage stores of desktops and/or applications that are available for users to access. In some implementations, the client access manager 410 may provide an application "storefront" for an enterprise, which may provide users with self-service access to the desktops and/or applications that the enterprise opts to make available to them. In some implementations, the client access manager 410 may also keep track of users' application subscriptions, shortcut names, and other data. Tracking such data may, for example, help ensure that users have a consistent experience across multiple devices.

As shown in FIG. 4A, a resource access application 424 may be installed on client devices 202 or other endpoints (such as virtual desktops). Such resource access applications 424 may provide users with quick, secure, self-service access to documents, applications, and/or desktops. The resource access application 424 may, for example, provide on-demand access to Windows, web, and/or Software as a Service (SaaS) applications. The Citrix Workspace™ app, offered by Citrix Systems, Inc., of Fort Lauderdale, Fla., is one example implementation of such a client-based version of the resource access application 424. In some implementations, the resource access application 424 may alternatively operate on a web server (not shown in FIG. 4A) and may be accessed using a web browser (also not shown in FIG. 4A) installed on the client device 202. In some embodiments, for example, the resource access application 424 may be provided as a hypertext markup language 5 (HTML-5) service and may be accessed using an HTML-5-compatible web browser. The Citrix Workspace™ app for HTML-5, offered by Citrix Systems, Inc., of Fort Lauderdale, Fla., is one example implementation of such a web-based version of the resource access application 424.

In some embodiments, the resource access application 424 may intercept network communications from a network stack used by the one or more applications. For example, the resource access application 424 may intercept a network communication at any point in a network stack and redirect the network communication to a destination desired, managed, and/or controlled by the resource access application 424, for example, to intercept and redirect a transport layer connection to an IP address and port controlled and/or managed by resource access application 424. The resource access application 424 may thus, in some embodiments, transparently intercept any protocol layer below the transport layer, such as the network layer, and any protocol layer above the transport layer, such as the session, presentation, or application layers. The resource access application 424 may, for example, interface with the transport layer to secure, optimize, accelerate, route, and/or load-balance any communications provided via any protocol carried by the transport layer.

In some embodiments, the resource access application 424 may be implemented as an Independent Computing Architecture (ICA) client developed by Citrix Systems, Inc. The resource access application 424 may perform acceleration, streaming, monitoring, and/or other operations. For example, the resource access application 424 may accelerate streaming an application from a shared computing resource 402 running a resource delivery agent 404 to the client device 202. The resource access application 424 may also perform endpoint detection/scanning and/or collect endpoint information about the client 202. For example, the resource access application 424 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The resource manager 414 shown in FIG. 4A, may provide a console from which the configuration and management of applications and desktops that are to be made available to users may be controlled. The Studio component of the Citrix Virtual Apps and Desktops™ system offered by Citrix Systems, Inc., of Fort Lauderdale, Fla., is one example implementation of the resource manager 414. In some implementations, the resource manager 414 may eliminate the need for separate management consoles for managing delivery of applications and desktops. In some embodiments, the resource manager 414 may provide one or more wizards to guide system administrators through environment setup, creating workloads to host applications and desktops, and assigning applications and desktops to users. In some implementations, the resource manager 414 may also be used to allocate and track licenses for the resource delivery system 400. In some embodiments, the resource manager 414 may get the information it displays from the broker service 432 of the resource delivery controller(s) 412, e.g., communicating over TCP port "80."

The resource director 416 may, for example, be a web-based tool that enables IT support and help desk teams to monitor an environment, troubleshoot issues before they become system-critical, and perform support tasks for end users. The Director component of the Citrix Virtual Apps and Desktops™ system offered by Citrix Systems, Inc., of Fort Lauderdale, Fla., is one example implementation of the resource director 416. In some implementations, a single deployment of the resource director 416 may be used to connect to and monitor multiple resource delivery systems 400, such as that shown in FIG. 4A. Examples of information that may be displayed by the resource director 416 include (A) real-time session data from the broker service 432 of the resource delivery controller(s) 412, which may include data the broker service 432 gets from the broker agent 456 in the resource delivery agents 404, and (B) historical data about the resource delivery system 422 that may be received, for example, from the monitor service 460 in the resource delivery controller(s) 412. In some implementations, the resource director 416 may use performance and heuristics data captured by the gateway 408 (described below) to build analytics from the data and then presents such analytics to system administrators. Further, in some implementations, the resource director 416 may allow system administrators to view and interact with a user's sessions, e.g., using Windows Remote Assistance.

The license manager 418, as its name implies, may enable the management of licenses within the resource delivery system 400. In some implementations, the license manager 418 may communicate with the resource delivery controller (s) 412 to manage licensing for a user's session and with the resource manager 414 to allocate license files.

As noted above, in some implementations, the shared computing resources 402 shown in FIG. 4A may include one or more virtual machines. These can be virtual machines that are used to host applications and/or desktops, as well as virtual machines that are used to host the other components of the resource delivery system 400. In some implementations, a hypervisor may be installed on a host computer to run the hypervisor and hosting virtual machines.

Although not depicted in FIG. 4A, in some implementations, the resource delivery system 400 may additionally include a performance monitoring service or agent. In some embodiments, one or more dedicated servers (or a dedicated service in a cloud-based environment) may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., as a part of the resource access application 424), one or more servers 204, or one or more other system component(s). In general, the monitoring agents may execute transparently (e.g., in the background) to any application and/or user of the device. In some embodiments, such a monitoring agent may be implemented as components of Citrix Analytics™ by Citrix Systems, Inc., of Fort Lauderdale, Fla.

The monitoring agents may, for example, monitor, measure, collect, and/or analyze data on a frequency (e.g., a predetermined frequency), based upon an occurrence of given event(s), or in real time during operation of the resource delivery system 400. The monitoring agents may, for example, monitor resource consumption and/or performance of hardware, software, and/or communications resources of the clients 202, the gateway 408 (and/or any other components in the DMZ 428), and/or the resource delivery controller(s) 412, the shared computing resources 402, the resource delivery agents 404, or any other components shown in FIG. 4A. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

Figure 4B:
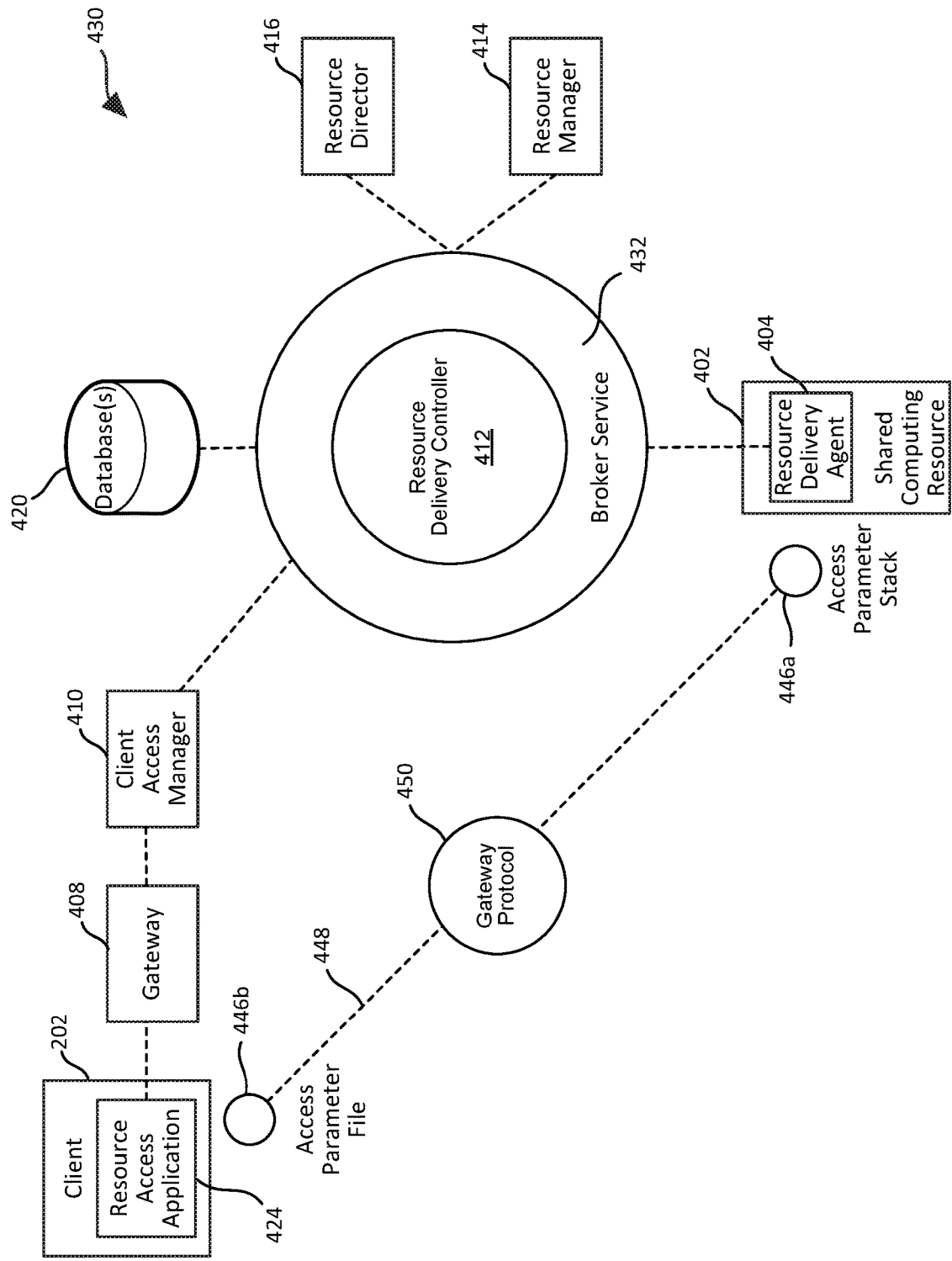
FIG. 4B illustrates an example deployment of a resource delivery system such as that shown in FIG. 4A.

The monitoring agents may provide application performance management for the resource delivery system 400. For example, based upon one or more monitored performance conditions or metrics, the resource delivery system 400 may be dynamically adjusted, for example periodically or in real-time, to optimize application delivery by the resource delivery agents 404 to the clients 202 based upon network environment performance and conditions FIG. 4B illustrates an example deployment 430 of a resource delivery system 400, such as that shown in FIG. 4A. Such a deployment may be referred to as a "Site." A Site may be made up of machines with dedicated roles that allow for scalability, high availability, and failover, and may provide a solution that is secure by design. As discussed above, such a Site may include servers and/or desktop machines installed with resource delivery agents 404, and one or more resource delivery controller(s) 412, which may manage access to such servers/machines. FIG. 4B illustrates one such resource delivery agent 404, and one such resource delivery controller 412. As shown in FIG. 4B, the resource delivery controller 412 may include a broker service 432. The resource delivery agent 404 may enable users to connect to desktops and/or applications. It may be installed on server or desktop machines in a datacenter for most delivery methods, but it may also be installed on physical personal computers (PCs) for Remote PC Access. In some implementations, the resource delivery controller 412 may be made up of independent Windows services that may manage resources, applications, and/or desktops, and may optimize and balance user connections.

In some embodiments, client devices 202 may not directly access the resource delivery controller 412. Instead, the resource delivery agent 404 and the client access manager 410 may serve as intermediaries between client devices 202 and the resource delivery controller 412. When users log on using the client access manager 410, their credentials may pass through to the broker service 432 on the resource delivery controller 412. The broker service 432 may then obtain profiles and available resources based on the policies set for them.

Figure 4C:
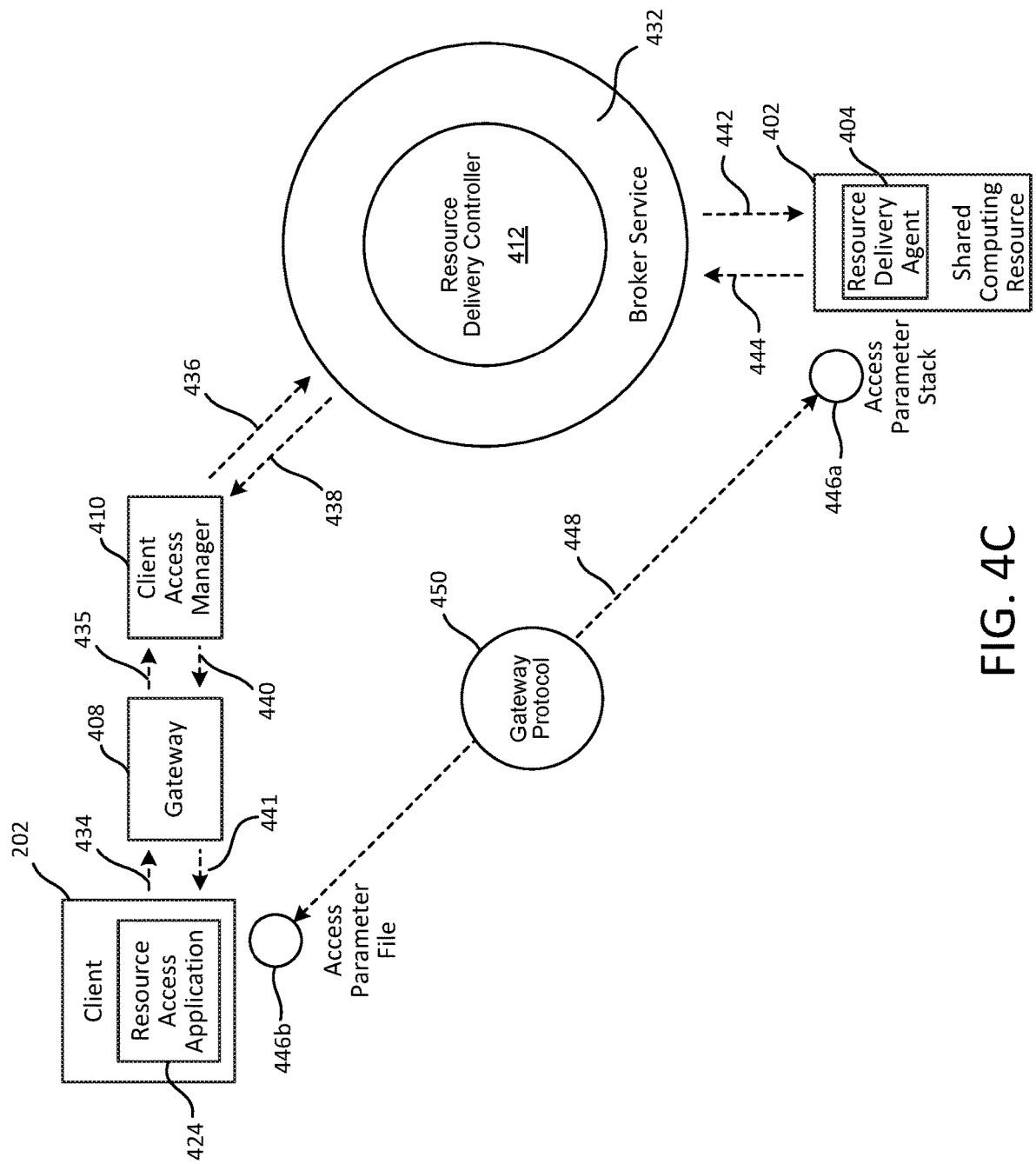
FIG. 4C illustrates an example process for handling user connections within the deployment shown in FIG. 4B.

FIG. 4C illustrates an example process for handling user connections within the deployment 430 shown in FIG. 4B. As indicated by arrows 434 and 435, to start a session, a user may cause the client device 202 to connect (via the gateway 408) to the client access manager 410. Such a connection may, for example, be established using the resource access application 424. As noted above, the resource access application 424 may either be installed on the client device 202 or accessible from a web server via a web browser on the client device 202.

As indicated by arrow 436, the user's credentials may then move through this pathway to access the broker service 432 of resource delivery controller 412. In some implementations, such communications may be encrypted to protect the security of such credentials. The broker service 432 may determine which desktops and/or applications the user is allowed to access. After the credentials have been verified, information about available applications and/or desktops may be sent back to the client device 202 through the pathway between the client access manager 410 and the resource access application 424, as indicated by arrows 438, 440, and 441. The user of the client device 202 may thus be provided with a list of available applications and/or desktops. When the user selects an application or desktop from this list, an indication of the selected resource goes back down the previously described pathway to the resource delivery controller 412. The resource delivery controller 412 may then select an appropriate resource delivery agent 404 to host the selected applications or desktop.

As indicated by arrow 442, the resource delivery controller 412 may send a message to the selected resource delivery agent 404 with the user's credentials, and may then send pertinent data about the user and the connection to the resource delivery agent 404. The resource delivery agent 404 may then accept the connection and, as indicated by arrows 444, 438, 440, and 441, may send a set of access parameters (stored in an access parameter stack 446a) back through the same pathways to the resource access application 424. In particular, the set of access parameters may be collected by the client access manager 410 and then sent to the resource access application 424 where they may be stored as an access parameter file 446b. In some implementations, the access parameter file 446b may be created as part of a protocol conversation between the client access manager 410 and the resource access application 424. In other implementations, the client access manager 410 may convert the access parameters to the file 446b, and that file 446b may then be downloaded to the client device 202. In some implementations, the access parameters may remain encrypted throughout this process.

The access parameter file 446b that is then stored on the client device 202 may be used to establish a direct connection 448 between the client device 202 and the access parameter stack 446a running on the resource delivery agent 404. As illustrated, the connection 448 between the client device 202 and the resource delivery agent 404 may use a gateway protocol 450. In some implementations, the gateway protocol 450 may include a feature that enables the client device 202 to immediately reconnect to the resource delivery agent 404 if the connection 448 is lost, rather than having to relaunch through the management infrastructure (including the client access manager 410, the resource delivery controller 412, etc.).

After the client device 202 connects to the resource delivery agent 404, the resource delivery agent 404 may notify the resource delivery controller 412 that the user is logged on. The resource delivery controller 412 may then send this information to the database(s) 420 (shown in FIGS. 4A, 4B and 4D) and the monitor service 460 (shown in FIG. 4D) of the delivery controller 412 may also start logging data in the database(s) 420.

Figure 4D:
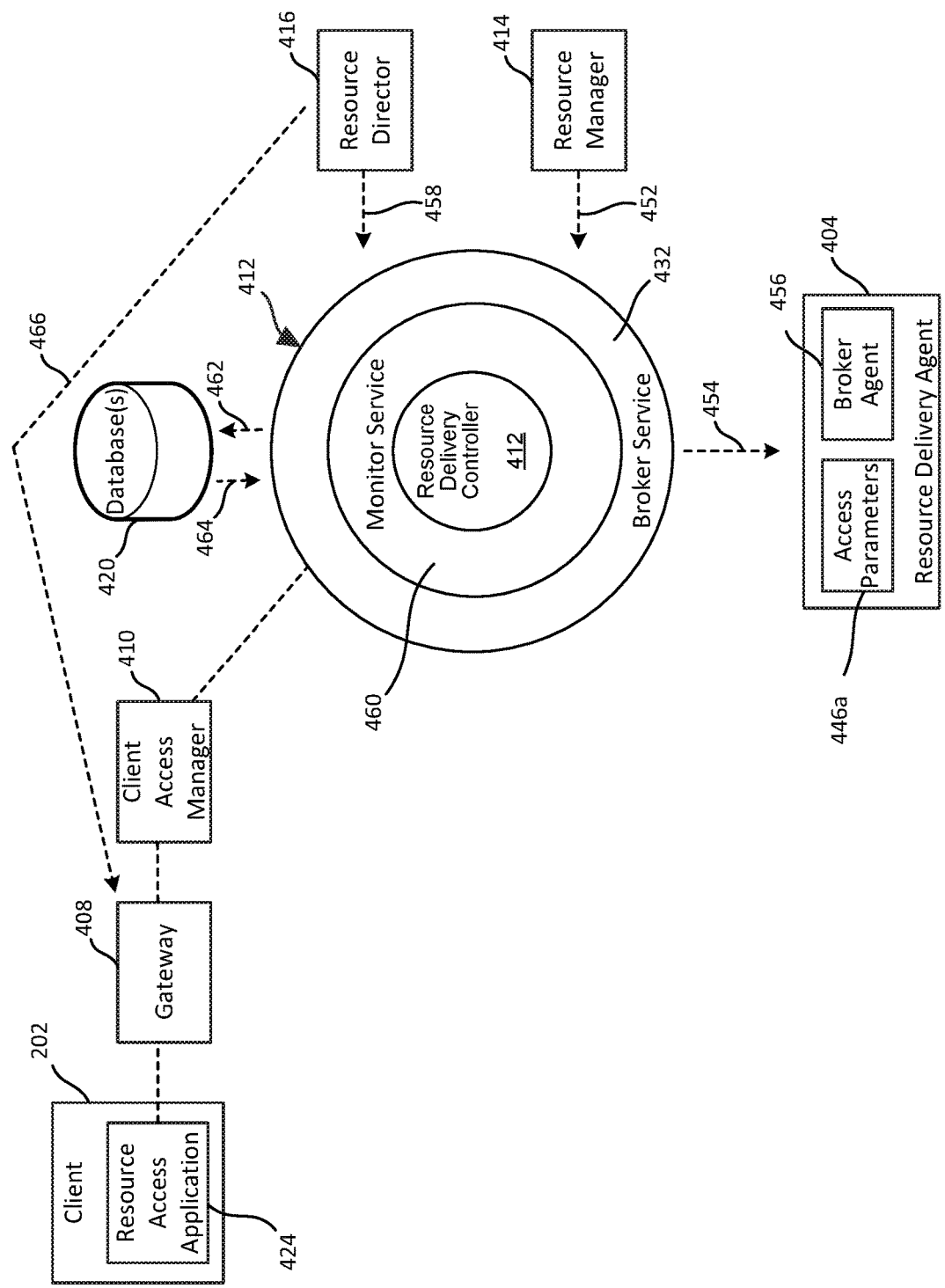
FIG. 4D shows examples of paths through which the resource manager and the resource director shown in FIG. 4B may access stored data.

Such sessions between client devices 202 and resource delivery agents 404 produce data that system administrators can access through the resource manager 414 and/or the resource director 416. FIG. 4D shows examples of paths through which the resource manager 414 and the resource director 416 may access such data in some embodiments. As indicated by the arrows 452 and 454, administrators may use the resource manager 414 to access real-time data from the broker agent 456 of a resource delivery agent 404 (via the broker service 432 of the resource delivery controller 412). The resource director 416 may access the same data, as indicated by arrows 458 and 454, plus any historical data the monitor service 460 of the resource delivery controller 412 stores in the database(s) 420, as indicated by arrows 458, 462 and 464. Further, as indicated by arrow 466, the resource director 416 may also access data from the gateway 408 for help desk support and troubleshooting.

Within the resource delivery controller 412, the broker service 432 may report session data for every session on the machine providing real-time data. The monitor service 460 may also track the real-time data and store it as historical data in the database(s) 420. In some implementations, the resource manager 414 may communicate with the broker service 432 and may access real-time data. The resource director 416 may communicate with the broker service 432 to access the database(s) 420.

An example process for enabling the delivery of applications and/or desktops will now be described. First, the machines that are to deliver applications and/or desktops may be set up with "Machine Catalogs." Then, "Delivery Groups" may be created that specify the applications and/or desktops that are to be made available (using machines in the Machine Catalogs), and which users can access them. In some implementations, "Application Groups" may also be created to manage collections of applications.

Machine Catalogs are collections of virtual or physical machines that can be managed as a single entity. These machines, and the application and/or virtual desktops on them, are the resources that may be made available to users. All the machines in a Machine Catalog may have the same operating system and the same resource delivery agent 404 installed. They may also have the same applications and/or virtual desktops.

In some implementations, a master image may be created and used to create identical virtual machines in the catalog. For virtual machines, the provisioning method may be specified for the machines in that catalog. Valid machine types may, for example, include "Multi-session OS," "Single-session OS," and "Remote PC access." A Multi-session OS machine is a virtual or physical machine with a multi-session operating system. Such a machine may be used to deliver published applications (also known as server-based hosted applications) and published desktops (also known as server-hosted desktops). These machines may allow multiple users to connect to them at one time. A Single-session OS machine is a virtual or physical machine with a single-session operating system. Such a machine may be used to deliver Virtual Desktop Infrastructure (VDI) desktops (desktops running single-session OSs that can optionally be personalized), virtual machine (VM)-hosted apps (applications from single-session OSs), and hosted physical desktops. Only one user at a time can connect to each of these desktops. A Remote PC access machine may enable remote users to access their physical office PCs from any device running the resource access application 424.

Delivery Groups may specify which users can access which applications and/or desktops on which machines. Delivery Groups may include machines from the Machine Catalogs, and Active Directory users who have access to the Site. In some implementations, users may be assigned to Delivery Groups by their Active Directory group, because Active Directory groups and Delivery Groups are ways to group users with similar requirements.

Delivery Groups may contain machines from more than one Machine Catalog, and Machine Catalogs may contribute machines to more than one Delivery Group. In at least some implementations, however, individual machines can only belong to one Delivery Group at a time.

The specific resources that users in the Delivery Group can access may be defined. For example, to deliver different applications to different users, all of the applications may be installed on the master image for one Machine Catalog and enough machines may be created in that catalog to distribute among several Delivery Groups. Delivery Groups may then be configured to deliver a different subset of applications that are installed on the machines.

Application Groups may provide application management and resource control advantages over using more Delivery Groups. Using a "tag restriction" feature, existing machines may be used for more than one "publishing" task, saving the costs of deployment and managing additional machines. A tag restriction can be thought of as subdividing (or partitioning) the machines in a Delivery Group. Application Groups may also be helpful when isolating and troubleshooting a subset of machines in a Delivery Group.

"Tags" may be strings that identify items such as machines, applications, desktops, Delivery Groups, Application Groups, and policies. After creating a tag and adding it to an item, certain operations may be tailored to apply to only items that have a specified tag.

In some implementations, tags may be used to tailor search displays is the resource manager 414. For example, to display only applications that have been optimized for evaluation, a tag named "evaluate" may be created and may then be added (applied) to those applications. A search performed by the resource manager 414 may then be filtered with the tag "evaluate".

In some implementations, tags may be used to "publish" applications from an Application Group or specific desktops from a Delivery Group, considering only a subset of the machines in selected Delivery Groups. Using an Application Group or desktops with a tag restriction may be helpful when isolating and troubleshooting a subset of machines in a Delivery Group.

In some implementations, tags may be used to schedule periodic restarts for a subset of machines in a Delivery Group. Using a tag restriction for machines may, for example, enable the use of new PowerShell cmdlets to configure multiple restart schedules for subsets of machines in a Delivery Group.

In some implementations, tags may be used to tailor the application (assignment) of particular policies to a subset of machines in Delivery Groups, Delivery Group types, or organizational units (OUs) of a Site that have (or do not have) a specified tag. For example, if a particular policy is to be applied only to the more powerful workstations, a tag named "high power" may be applied to those machines and the policy may be set to apply to only machines to which the high power tag has been applied. Tags may additionally or alternatively be applied to particular Delivery Groups and one or more policies may be set to apply only the Delivery Groups to which such tags have been applied.

In some embodiments, the resource manager 414 may be used to create or edit a tag restriction for a desktop in a shared Delivery Group or an Application Group. In some implementations, creating such a tag restriction may involve several steps. First, a tag may be created and then added (applied) to one or more machines. Second a group may be created or edited to include the tag restriction, thus restricting launches to machines with the applied tag. A tag restriction may extend the machine selection process of the broker service 432. In particular, the broker service 432 may select a machine from an associated Delivery Group subject to access policy, configured user lists, zone preference, and launch readiness, plus the tag restriction (if present). For applications, the broker service 432 may fall back to other Delivery Groups in priority order, applying the same machine selection rules for each considered Delivery Group.

Figure 4E:
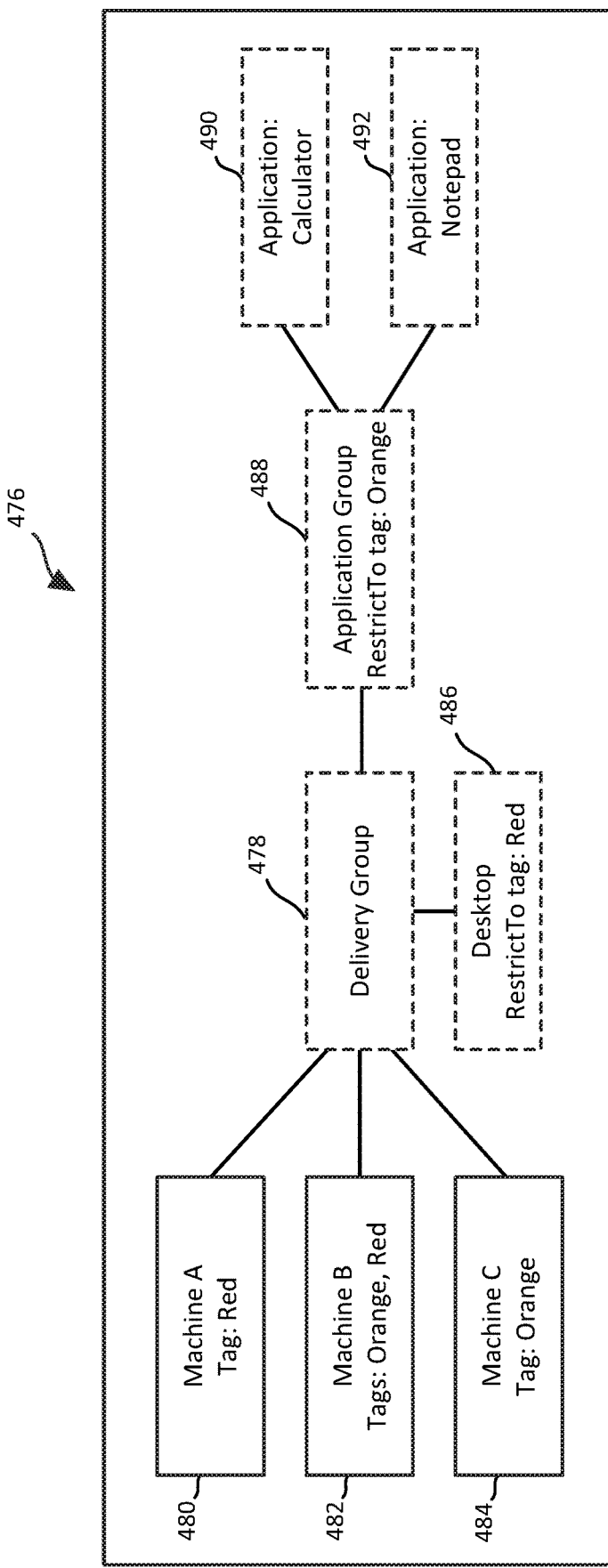
FIG. 4E illustrates a simple layout of a resource delivery system in which tag restrictions may be used to limit which machines will be considered for certain desktop and application launches.

FIG. 4E illustrates a simple layout in which tag restrictions may be used to limit which machines will be considered for certain desktop and application launches. In the illustrated example, a site 476 has one shared Delivery Group 478 configured with three machines 480, 482, 484 and one published desktop 486, and one Application Group 488 configured with two applications 490, 492. As shown, tags may be added to the three machines 480, 482, 484. A tag restriction named "Red" has been applied to the published desktop 486 in the shared Delivery Group 478, so that the published desktop 486 can be launched only on machines in that Delivery Group 478 that have the tag "Red," i.e., the machines 480 and 482. A tag restriction named "Orange" has been applied to the Application Group 488, so that its applications 490, 492 (Calculator and Notepad) can be launched only on machines in the Delivery Group 478 that have the tag "Orange," i.e., the machines 482 and 484. Since the machine 482 has both tags (Red and Orange), it can be considered for launching the applications 490, 492 and the desktop 486.

In some implementations, tags may be created, added (applied), edited, and/or deleted from selected items using the resource manager 414. Tag restrictions may, for example, be configured when creating or editing desktops in Delivery Groups and/or when creating or editing Application Groups.

As noted above, the resource delivery system 400 described in connection with FIGS. 4A-4E may provide virtualization solutions that give administrators control of virtual machines, applications, and security while providing anywhere access for any device. As was also noted above, the resource delivery system 400 may also enable end users to access applications and desktops independently of the operating systems and interfaces of the client devices 202 such end users are operating.

Figure 4F:
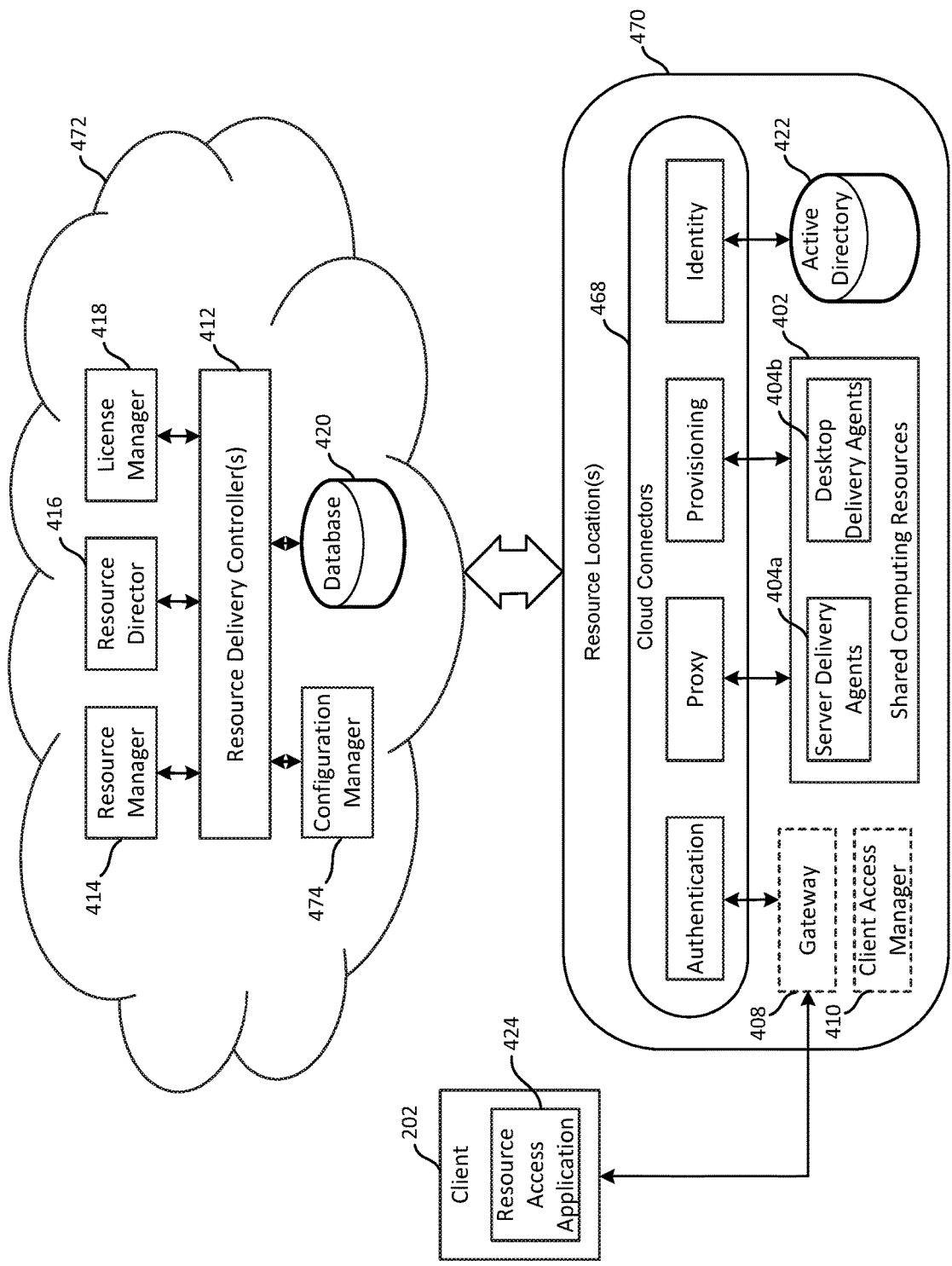
FIG. 4F is a block diagram of a resource delivery system similar to the shown in FIG. 4A but in which several elements are provided as a service within a cloud-based computing environment.

In some implementations, one or more components of the resource delivery system 400 may be provided as a service within a cloud-based computing environment. FIG. 4F illustrates an example of such an implementation. As shown in FIG. 4F, one or more cloud connectors 468 may enable various resources at one or more locations 470 outside of a cloud computing environment 472 to interface with various components within the cloud computing environment 472. As illustrated, resource location(s) 470 may include the machines and other resources that deliver applications and/or desktops to client devices 202. The resource location 470 may optionally include the gateway 408 and/or client access manager 410 previously described. In the illustrated example, the resource delivery controller(s) 412, the resource manager 414, the resource director 416, the license manager 418, and the database(s) 420 are all provided within the cloud computing environment 472. Further, as shown in FIG. 4F, a configuration manager 474 may additionally be hosted within the cloud computing environment 472 in some implementations. Examples of management functions that may be performed by the configuration manager 474 are described below. In some implementations, the cloud computing environment 472 may correspond to a public cloud computing infrastructure, such as AZURE CLOUD provided by Microsoft Corporation of Redmond, Wash., or AMAZON WEB SERVICES provided by Amazon.com, Inc., of Seattle, Wash.

In addition to serving as a channel for communication between the cloud computing environment 472 and the resource location(s) 470, the cloud connectors 468 may enable cloud management without requiring any complex networking or infrastructure configuration such as virtual private networks (VPNs) or Internet Protocol Security (IPsec) tunnels.

As noted above, the resource delivery controller(s) 412 may serve as the central control layer component in a deployment. The resource delivery controller(s) 412 may communicate through the cloud connectors 468 in each resource location 470 to distribute applications and/or desktops, authenticate and manage user access, broker connections between users and their virtual desktops and/or applications, optimize use connections, and/or load-balance use connections. In some implementations, the resource delivery controller(s) 412 may additionally track which users are logged on and where, which session resources the users have, and if users need to reconnect to existing applications. The resource delivery controller(s) 412 may further manage the state of desktops, starting and stopping them based on demand and administrative configuration, in some implementations.

The configuration manager 474 in the cloud computing environment 472 may (A) enable administrators to specify which services are to be made available to users via the resource access application, (B) customize the uniform resource locator (URL) that the resource access application 424 is to use to access the available resources, (C) customize the appearance of the user interface provided by the resource access application, such as logos, color, and preferences, (D) specify how users are to authenticate to the system, such as using the Active Directory 422, and/or (E) specify external connectivity for the resource locations 470.

As noted above, a resource location 470 may include at least one cloud connector 468 that serves as the communications channel between the components in the cloud computing environment 472 and the components in the resource location 470. In the resource location 470, the cloud connector(s) may act as a proxy for the resource delivery controller(s) 412 in the cloud computing environment 472.

As noted above, the physical or virtual machines that deliver applications and/or desktops may include resource delivery agents 404a, 404b. The resource delivery agents 404 may register with at least one cloud connector 468. After registration, connections may be brokered from those resources to users. The resource delivery agents 404 may further establish and manage the connection between the machine and the client device 202, and apply policies that are configured for the session. The resource delivery agents 404 may communicate session information to the cloud connector 468 through the broker agent 456 (shown in FIG. 4D) in the resource delivery agent 404. As noted above, in some implementations, such a broker agent 456 may host multiple plugins and collect real-time data.

A host connection may be established that enables communication between components in the cloud computing environment 472 and the resource delivery agents 404 on the shared computing resources 402. Specifications for such host connections may include (A) the address and credentials to access the host, (B) the tool that is to be used to create VMs, (C) the storage method to use, (D) the machines to use for storage, and/or (E) which network the VMs will use.

E. Example Architecture of a Resource Virtualization Server

Figure 5:
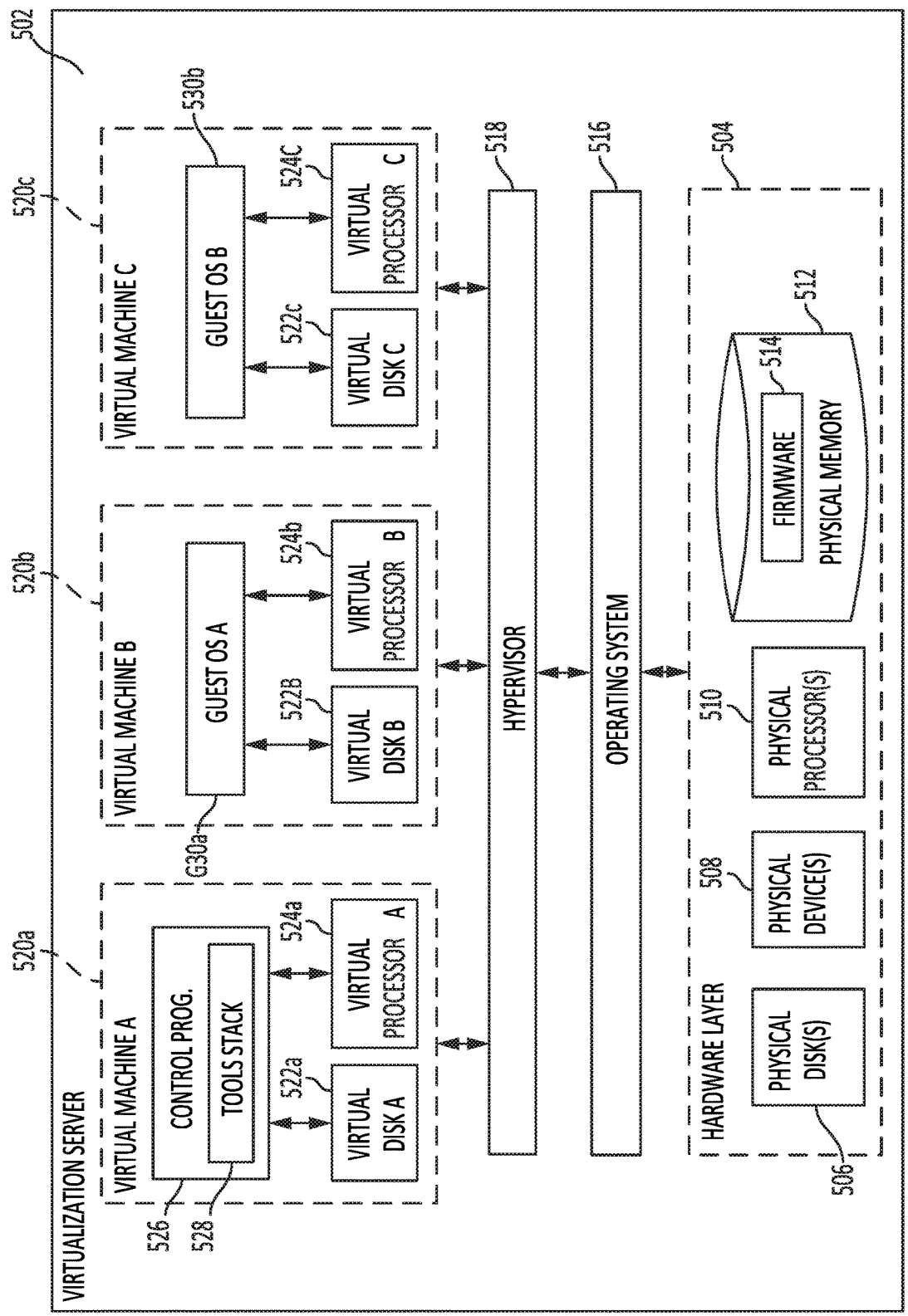
FIG. 5 depicts an example virtualized (hypervisor) system architecture that may be used in accordance with one or more embodiments described herein.

FIG. 5 shows an example architecture of an illustrative resource virtualization server 502. As shown, the resource virtualization server 502 may be configured to provide virtual desktops and/or virtual applications to one or more client access devices, such as the clients 202. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Instances of the operating system may be physical (e.g., one operating system per physical device) or virtual (e.g., many instances of an OS running on a single physical device). The applications may be executed on a local device, or executed on a remotely located device (e.g., remoted).

The virtualization server 502 illustrated in FIG. 5 may be deployed as and/or implemented by one or more of the servers 204 described above, the servers that make up a virtualization server system, or by other known computing devices. Included in the virtualization server 502 is a hardware layer 504 that may include one or more physical disks 506, one or more physical devices 508, one or more physical processors 510, and one or more physical memories 512. In some embodiments, firmware 514 may be stored within a memory element in physical memory 512 and be executed by one or more of the physical processors 510. The virtualization server 502 may further include an operating system 516 that may be stored in a memory element in physical memory 512 and executed by one or more of physical processors 510. Still further, a hypervisor 518 may be stored in a memory element in the physical memory 512 and be executed by one or more of the physical processors 510. Presence of the operating system 516 may be optional such as in a case where the hypervisor 518 is a Type 1 hypervisor; that is, a bare-metal hypervisor installed directly on the hardware layer 504. In some implementations, the hypervisor 518 may be a Type 2 hypervisor, which executes on a host operating system, such as the OS 516, which may provide virtualization services such as I/O device support and memory management.

Executing on one or more of the physical processors 510 may be one or more virtual machines 520a-c (generally 520). The virtual machines 520 may have respective virtual disks 522a-c and virtual processors 524a-c. In some embodiments, a first virtual machine 520a may execute, using the virtual processor 524a, a control program 526 that includes a tools stack 528. The control program 526 may be referred to as a control virtual machine, Domain 0, Dom0, or other virtual machine used for system administration and/or control. In some embodiments, one or more of the virtual machines 520b-c may execute, using a virtual processor 524b-c, a guest operating system 530a-b (generally 530).

The physical devices 508 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 502. The physical memory 512 in hardware layer 504 may include any type of memory. The physical memory 512 may store data, and in some embodiments may store one or more programs, or set of executable instructions. FIG. 5 illustrates an embodiment where firmware 514 is stored within physical memory 512 of virtualization server 502. Programs or executable instructions stored in physical memory 512 may be executed by the one or more of the processors 510 of the virtualization server 502.

The virtualization server 502 may also include hypervisor 518. In some embodiments, the hypervisor 518 may be a program executed by processors 510 on the virtualization server 502 to create and manage any number of virtual machines 520. The hypervisor 518 may be referred to as a virtual machine monitor, or platform virtualization software. In some embodiments, the hypervisor 518 may be any combination of executable instructions and hardware that monitors virtual machines 520 executing on a computing machine. The hypervisor 518 may be a Type 2 hypervisor, where the hypervisor executes within operating system 516 executing on virtualization server 502. The virtual machines may then execute at a layer above hypervisor 518. In some embodiments, the Type 2 hypervisor may execute within the context of a user's operating system such that the Type 2 hypervisor interacts with the user's operating system. In other embodiments, one or more virtualization servers 502 in a virtualization environment may instead include a Type 1 hypervisor (not shown). A Type 1 hypervisor may execute on the virtualization server 502 by directly accessing the hardware and resources within hardware layer 504. That is, while the Type 2 hypervisor 518 accesses system resources through host operating system 516, as shown, a Type 1 hypervisor may directly access all system resources without host operating system 516. A Type 1 hypervisor may execute directly on one or more physical processors 510 of the virtualization server 502, and may include program data stored in the physical memory 512.

The hypervisor 518, in some embodiments, may provide virtual resources to the guest operating systems 530 or control programs 526 executing on virtual machines 520 in any manner that simulates the operating systems 530 or control programs 526 having direct access to system resources. System resources may include, but are not limited to, the physical devices 508, the physical disks 506, the physical processors 510, physical memory 512, and any other component included in the hardware layer 504 of the virtualization server 502. The hypervisor 518 may be used to emulate virtual hardware, partition physical hardware, virtualize physical hardware, and/or execute virtual machines that provide access to computing environments. In still other embodiments, the hypervisor 518 may control processor scheduling and memory partitioning for the virtual machine 520 executing on the virtualization server 502. Examples of hypervisor 518 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, the virtualization server 502 may execute a hypervisor 518 that creates a virtual machine platform on which the guest operating systems 530 may execute. In these embodiments, the virtualization server 502 may be referred to as a host server. An example of such a virtualization server is Citrix Hypervisor® provided by Citrix Systems, Inc., of Fort Lauderdale, Fla.

The hypervisor 518 may create one or more virtual machines 520b-c (generally 520) in which guest operating systems 530 execute. In some embodiments, the hypervisor 518 may load a virtual machine image to create a virtual machine 520. The virtual machine image may refer to a collection of data, states, instructions, etc. that make up an instance of a virtual machine. In other embodiments, the hypervisor 518 may execute guest operating system 530 within the virtual machine 520. In still other embodiments, the virtual machine 520 may execute the guest operating system 530.

In addition to creating the virtual machines 520, the hypervisor 518 may control the execution of at least one virtual machine 520. In other embodiments, the hypervisor 518 may present at least one virtual machine 520 with an abstraction of at least one hardware resource provided by the virtualization server 502 (e.g., any hardware resource available within hardware layer 504). In other embodiments, the hypervisor 518 may control the manner in which the virtual machines 520 access physical processors 510 available in the virtualization server 502. Controlling access to the physical processors 510 may include determining whether the virtual machine 520 should have access to the processor 510, and how physical processor capabilities are presented to the virtual machine 520.

As shown in FIG. 5, the virtualization server 502 may host or execute one or more virtual machines 520. A virtual machine 520 may be a set of executable instructions and/or user data that, when executed by processor 510, may imitate the operation of a physical computer such that the virtual machine 520 may execute programs and processes much like a physical computing device. While FIG. 5 illustrates an embodiment where the virtualization server 502 hosts three virtual machines 520, in other embodiments the virtualization server 502 may host any number of virtual machines 520. The hypervisor 518, in some embodiments, may provide the virtual machines 520 with unique virtual views of the physical hardware, including the memory 512, the processor 510, and other system resources 506, 508 available to the respective virtual machines 520. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 518 may create one or more unsecure virtual machines 520 and one or more secure virtual machines 520. The unsecure virtual machines 520 may be prevented from accessing resources, hardware, memory locations, and programs that the secure virtual machines 520 may be permitted to access. In other embodiments, the hypervisor 518 may provide the virtual machines 520 with substantially similar virtual views of the physical hardware, memory, processor, and other system resources available to the virtual machines 520.

The virtual machines 520 may include respective virtual disks 522a-c (generally 522) and virtual processors 524a-c (generally 524.) The virtual disk 522, in some embodiments, may be a virtualized view of one or more physical disks 506 of the virtualization server 502, or a portion of one or more physical disks 506 of the virtualization server 502. The virtualized view of the physical disks 506 may be generated, provided, and managed by the hypervisor 518. In some embodiments, the hypervisor 518 may provide the virtual machines 520 with unique views of the physical disks 506. Thus, in these embodiments, a particular virtual disk 522 included in a respective virtual machine 520 may be unique when compared with other virtual disks 522.

The virtual processor 524 may be a virtualized view of one or more physical processors 510 of the virtualization server 502. In some embodiments, the virtualized view of physical processors 510 may be generated, provided, and managed by the hypervisor 518. In some embodiments, the virtual processor 524 may have substantially all of the same characteristics of at least one physical processor 510. In other embodiments, the virtual processor 510 may provide a modified view of the physical processors 510 such that at least some of the characteristics of the virtual processor 524 are different from the characteristics of the corresponding physical processor 510.

Figure 6:
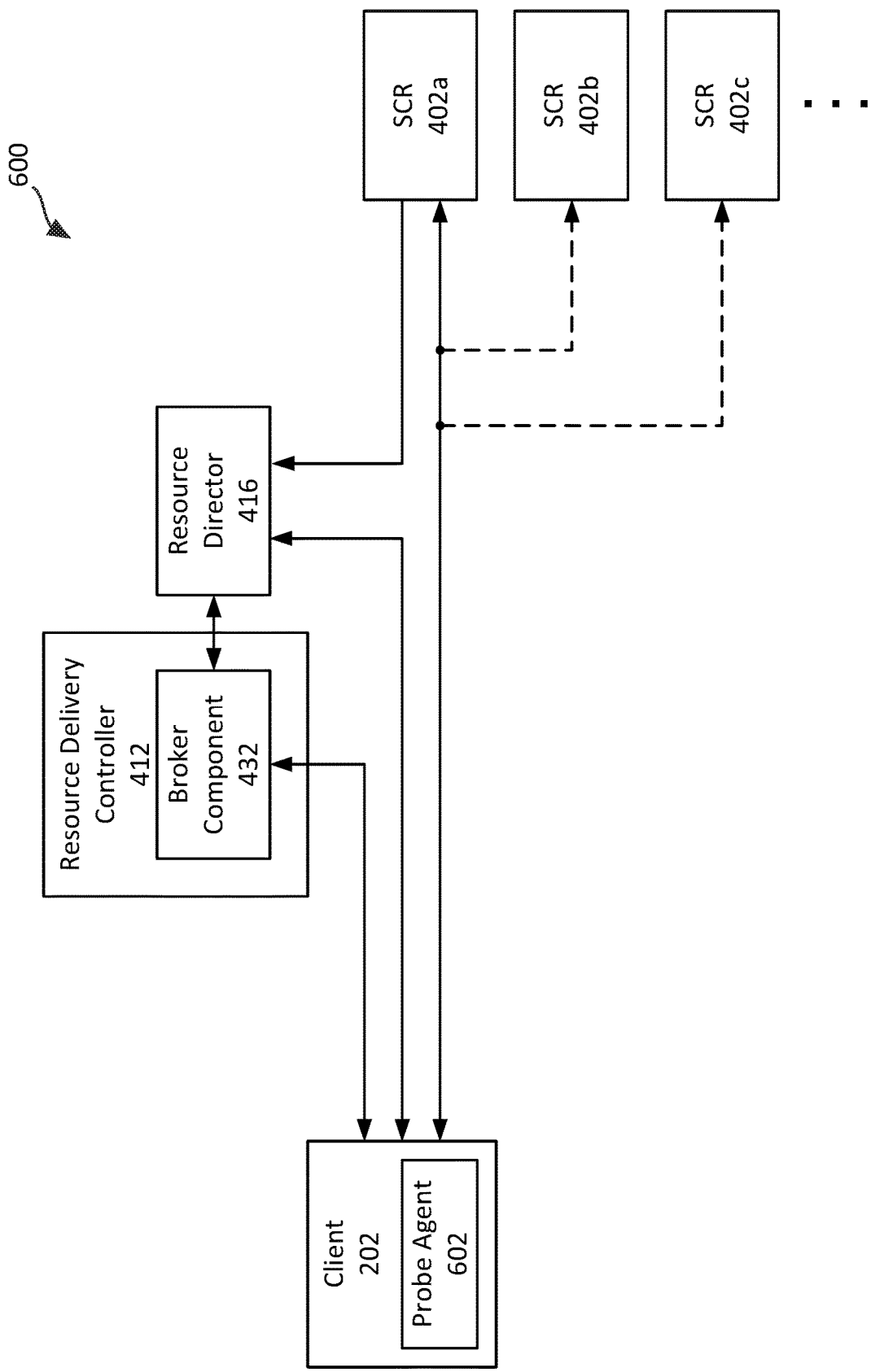
FIG. 6 shows an example embodiment of a resource delivery system configured to detect faulty resources using targeted application probing in accordance with some embodiments of the present disclosure.

F. Detailed Description of Example Embodiments of a Resource Delivery System Configured to Detect Faulty Resources Using Targeted Application Probing that were Introduced Above in Section A FIG. 6 shows an example embodiment of a resource delivery system 600 configured to detect faulty resources using targeted application probing in accordance with some embodiments of the present disclosure. In some implementations, the resource delivery system 600 may be the same or similar to the resource delivery system 102, 400 described above in Section A. Further, in some implementations, the resource delivery system 600 may be included within, or operate in conjunction with, the resource delivery system 400 described above in Section D. As shown, the resource delivery system 600 may include a resource delivery controller 412 that facilitates connections between one or more client devices 202 and one of one or more shared computing resources 402a, 402b, 402c, etc. (collectively "shared computing resources 402"). The resource delivery controller 412 may include a broker component (or broker service) 432 which may receive a request for access to an application or virtual desktop service from the client 202 and respond to that request with information for connecting to a shared computing resource 402. The resource delivery system 600 may also include a resource director 416, which may monitor data regarding the operation and health of the shared computing resources 402, identify shared computing resources 402 to be evaluated, and configure the broker component 432 to direct the client 202 to the shared computing resources 402.

As FIG. 6 illustrates, the client 202 may include a probe agent 602. The probe agent 602 may be an application executing on the client device 202 that enables to client device 202 to act as though under the control of a fake user under the direction of a resource director 416 to, for example, simulate a shared resource request by a user. The probe agent 602 may, either independently or in conjunction with a resource access application 424, request access to an application provided by the resource delivery system 600. The probe agent 602 may receive from the broker component 432 information for establishing a connection to a shared computing resource 402, attempt to establish a connection with the shared computing resource 402, and report the results of connection attempts back to the resource director 416. If a shared computing resource 402 is found to be faulty, the resource director 416 may take corrective action, such repairing or rebooting the faulty shared computing resource 402. Operations of various implementations of the resource delivery system 600 are described below with reference to FIGS. 7 through 9.

Figure 7A:
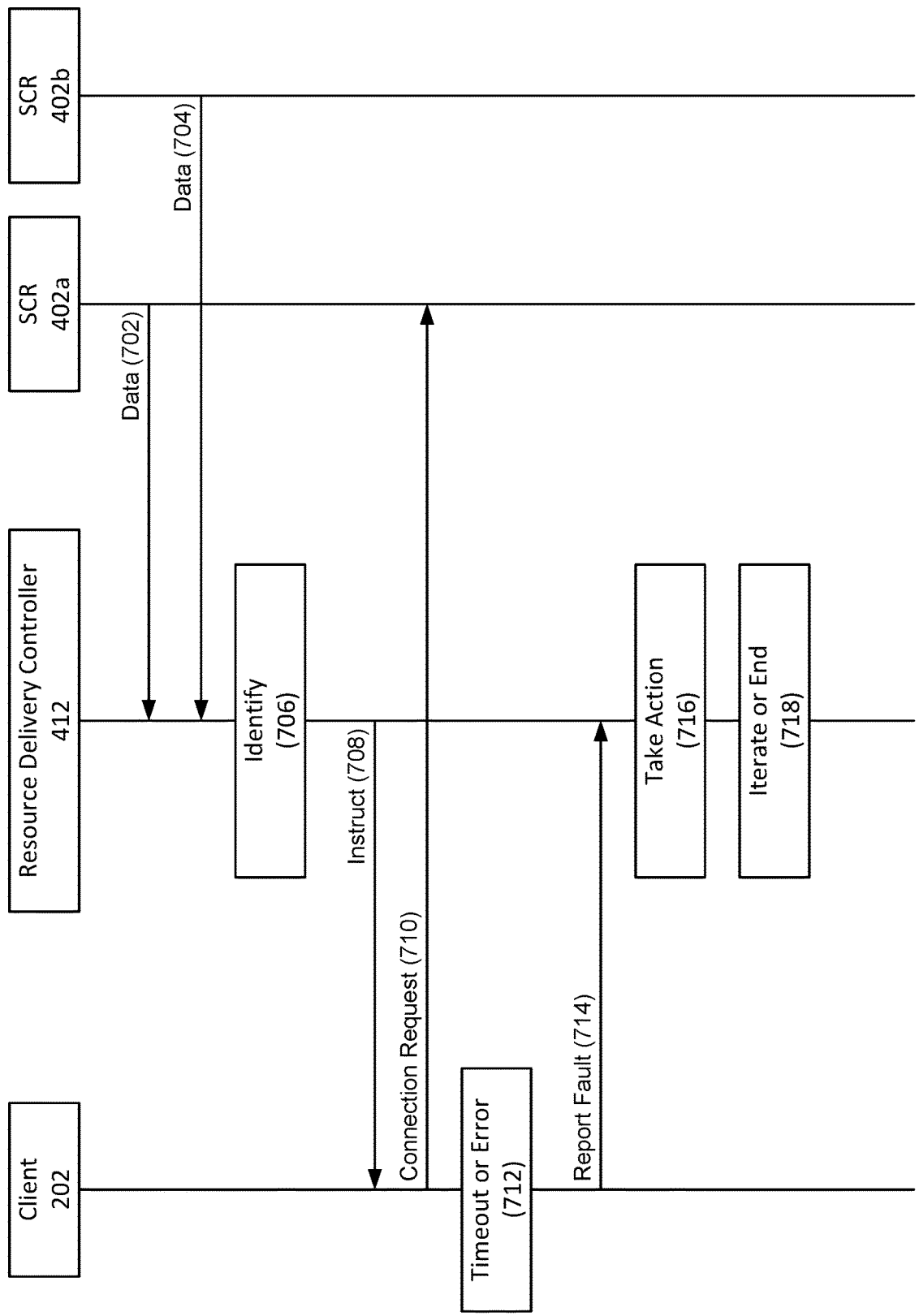

FIGS. 7A and 7B show illustrative signal diagrams according to a first example implementation of the resource delivery system 600 shown in FIG. 6. In particular, FIGS. 7A and 7B show various communications between the client device 202, the resource delivery controller 412, and first and second shared computing resources 402a and 402b. As shown, the resource delivery controller 412 may collect operational status and/or health data from the first shared computing resource 402a (702) and the second shared computing resource 402b (704). The resource delivery controller 412 may, for example, receive such data from a monitor service of or in communication with the resource delivery controller 412, and/or from a monitor service executing on the shared computing resources 402 themselves. Collection may be done periodically on a schedule at regular or irregular intervals, or on demand in response to an action. Collection may be pull-based (that is, based on requests from the resource delivery controller 412) or push-based (based on messages or updates sent from the monitor service(s)). Based on the operational status and/or health data, the resource delivery controller 412 may identify (706) one or more shared computing resources 402 to evaluate with the client 202 as previously described in FIG. 1, step 114. For example, the resource delivery controller 412 may determine based on the received health data that one or both of the shared computing resources 402 exhibit signs that may indicate that they are faulty. For example, the resource delivery controller 412 may interpret a low average CPU load for a shared computing resource 402 combined with a high time variable indicating a time that the shared computing resource 402 has been available as an indication that connections directed to that shared computing resource 402 have not been successful. The resource delivery controller 412 may instruct (708) the client device 202 to attempt to connect to the first shared computing resource 402a. The client device 202 may send the connection request (710) to the first shared computing resource 402a. In the example operations shown in FIG. 7A, the first shared computing resource 402a either does not respond within a specified time period (timeout), or the client 202 receives some type of error (712). The client 202 may therefore report (714) the faulty shared computing resource 402a to the resource delivery controller 412. The resource delivery controller 412 may take some type of corrective action (716) with regard to the fault, such as by alerting an administrator, logging the fault, and/or attempting to repair or reboot the first shared computing resource 402a. In some implementations, the resource delivery controller 412 may identify additional shared computing resources 402 to be evaluated based on features of the faulty first shared computing resource 402a (e.g., software versions or network settings) and/or information about the fault (e.g., error messages received). The resource delivery controller 412 may then test additional shared computing resources 402, or may end the evaluations (718).

FIG. 7B shows additional example operations in which the client 202 attempts a connection with the second shared computing resource 402b and is successful. The additional operations may be a continuation of the operations of FIG. 7A or may occur during overlapping time periods; that is, preceding some of the operations of FIG. 7A. As shown, the resource delivery controller 412 may instruct (730) the client device 202 to attempt to connect to the second shared computing resource 402b. In some implementations, probing of multiple shared computing resources 402 may occur in parallel; for example, using multiple client devices 202. The client device 202 may send the connection request (732) to the second shared computing resource 402b. In the example operations shown in FIG. 7B, the second shared computing resource 402b responds with a connection response (734), and thus appears to be functioning normally. The client 202 may establish the connection (736) with the second shared computing resource 402b. The client 202 may therefore report (738) to the resource delivery controller 412 that the second shared computing resource 402b is not faulty. The resource delivery controller 412 may log the results (740) of the evaluation. The resource delivery controller 412 may then evaluate additional shared computing resources 402, or may end the evaluations (742).

Figure 8B:
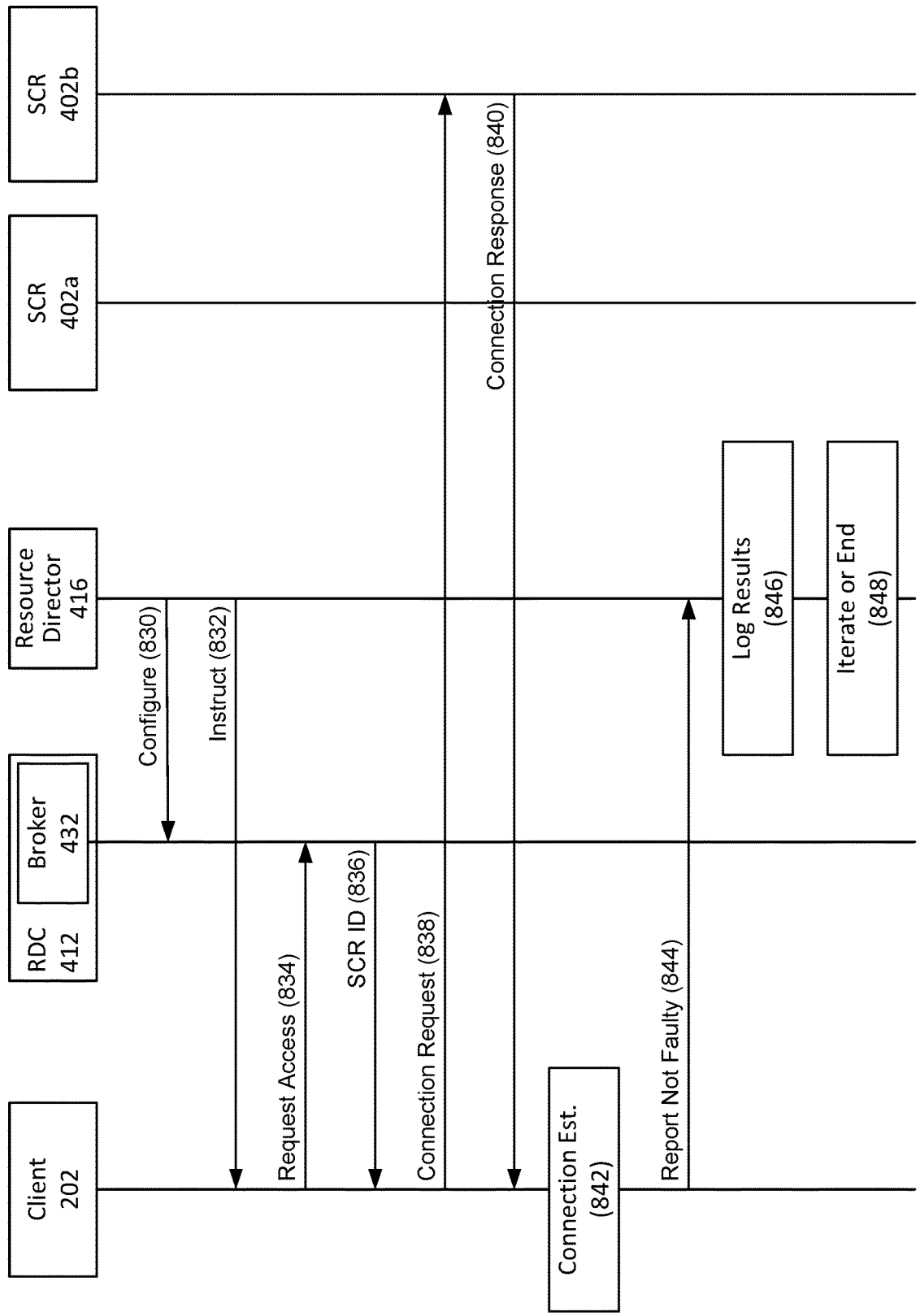

FIGS. 8A and 8B show illustrative signal diagrams according to a second example implementation of the resource delivery system 600 shown in FIG. 6. In this example implementation, the resource delivery system 600 may use tag restrictions to direct requests for access to certain shared computing resources 402. In particular, FIGS. 8A and 8B show various communications between the client device 202, the resource delivery controller 412 (including a broker component 432), a resource director 416, and first and second shared computing resources 402a and 402b. As shown, the resource director 416 may collect operational status and/or health data from the first shared computing resource 402a (802) and the second shared computing resource 402b (804). The resource director 416 may, for example, receive such data from a monitor service of or in communication with the resource delivery controller 412, and/or from a monitor service executing on the shared computing resources 402 themselves. Based on the operational status and/or health data, the resource director 416 may identify (806) one or more shared computing resources 402 to evaluate with the client 202 as previously described in FIG. 1, step 114. For example, the resource director 416 may determine based on the received health data that one or both of the shared computing resources 402 exhibit signs that may indicate that they are faulty. For example, the resource director 416 may interpret a low average CPU load for a shared computing resource 402 combined with a high time variable indicating a time that the shared computing resource 402 has been available as an indication that connections directed to that shared computing resource 402 have not been successful. In this example, the resource director 416 identifies both the first and second shared computing resources 402 as targets for evaluation based on the received data. The resource director 416 may configure (808) the broker 432 to set a tag restriction for the first shared computing resource 402a. For example, the resource director 416 may create a tag restriction by assigning a common tag to an application and to the shared computing resource 402a. The tag restriction may be applied to the application and the shared computing resource 402a directly, or by way an application group that includes the application, and/or a Delivery Group defined to include the shared computing resource 402a. The broker component 432 may store the tag assignments; for example, in a database. Thus, the broker component 432 can direct any request for access from the client 202 to the tagged application to one of the shared computing resources 402 associated or otherwise assigned with the tag, even if other shared computing resource 432 appears to have a lower load and/or more open connections. The resource director 416 may instruct (810) the client 202 to request access to an application hosted by the shared computing resources 402. In some implementations, the resource director 416 may include in that instruction the tag that was used to configure the broker 432. The client 202 may request access (812) to an application or service provided by the resource delivery system 600. The broker 432 may receive the request and, based on the tag restriction, provide the client 202 with identifying information (814) for a particular shared computing resource 402 currently associated with the tag, in this case the first shared computing resource 402a. Using the information provided by the broker 432, the client 202 may send a connection request (816) to the first shared computing resource 402a. In the example operations shown in FIG. 8A, the first shared computing resource 402a either does not respond within a specified time period (timeout), or the client 202 receives some type of error (818). The client 202 may therefore report (820) the faulty shared computing resource 402a to the resource director 416. The resource director 416 may take some type of corrective action (822) with regard to the fault, such as by alerting an administrator, logging the fault, and/or attempting to repair or reboot the first shared computing resource 402a. In some implementations, the resource director 416 may identify additional shared computing resources 402 to be evaluated based on features of the faulty first shared computing resource 402a (e.g., software versions or network settings) and/or information about the fault (e.g., error messages received). The resource director 416 may then test additional shared computing resources 402, or may end the evaluations (824).

FIG. 8B shows additional example operations in which the client 202 attempts a connection with the second shared computing resource 402b and is successful. The additional operations may be a continuation of the operations of FIG. 8A or may occur during overlapping time periods; that is, preceding some of the operations of FIG. 8A. As shown, the resource director 416 may configure (830) the broker 432 to associate with or otherwise assign a tag (either the same tag as used in connection with step 808 or a new tag) to the second shared computing resource 402b. The resource director 416 may instruct (832) the client 202 to request access to an application hosted by the shared computing resources 402 and, in some implementations, may include the tag used to configure the broker 432 in that instruction. In some implementations, probing of multiple shared computing resources 402 may occur in parallel; for example, using multiple client devices 202. The client 202 may send another request for access (834) to the resource delivery controller 412. The broker 432 may receive the request and, based on the tag restriction, provide the client 202 with identifying information (836) for a particular shared computing resource 402 currently associated with or assigned the tag, in this case the second shared computing resource 402b. Using the information provided by the broker 432, the client 202 may send a connection request (838) to the second shared computing resource 402b. In the example operations shown in FIG. 8B, the second shared computing resource 402b responds with a connection response (840), and thus appears to be functioning normally. The client 202 may establish the connection (842) with the second shared computing resource 402b. The client 202 may therefore report (844) to the resource director 416 that the second shared computing resource 402b is not faulty. The resource director 416 may log the results (846) of the evaluation. The resource 416 may then evaluate additional shared computing resources 402, or may end the evaluations (848).

Figure 9A:
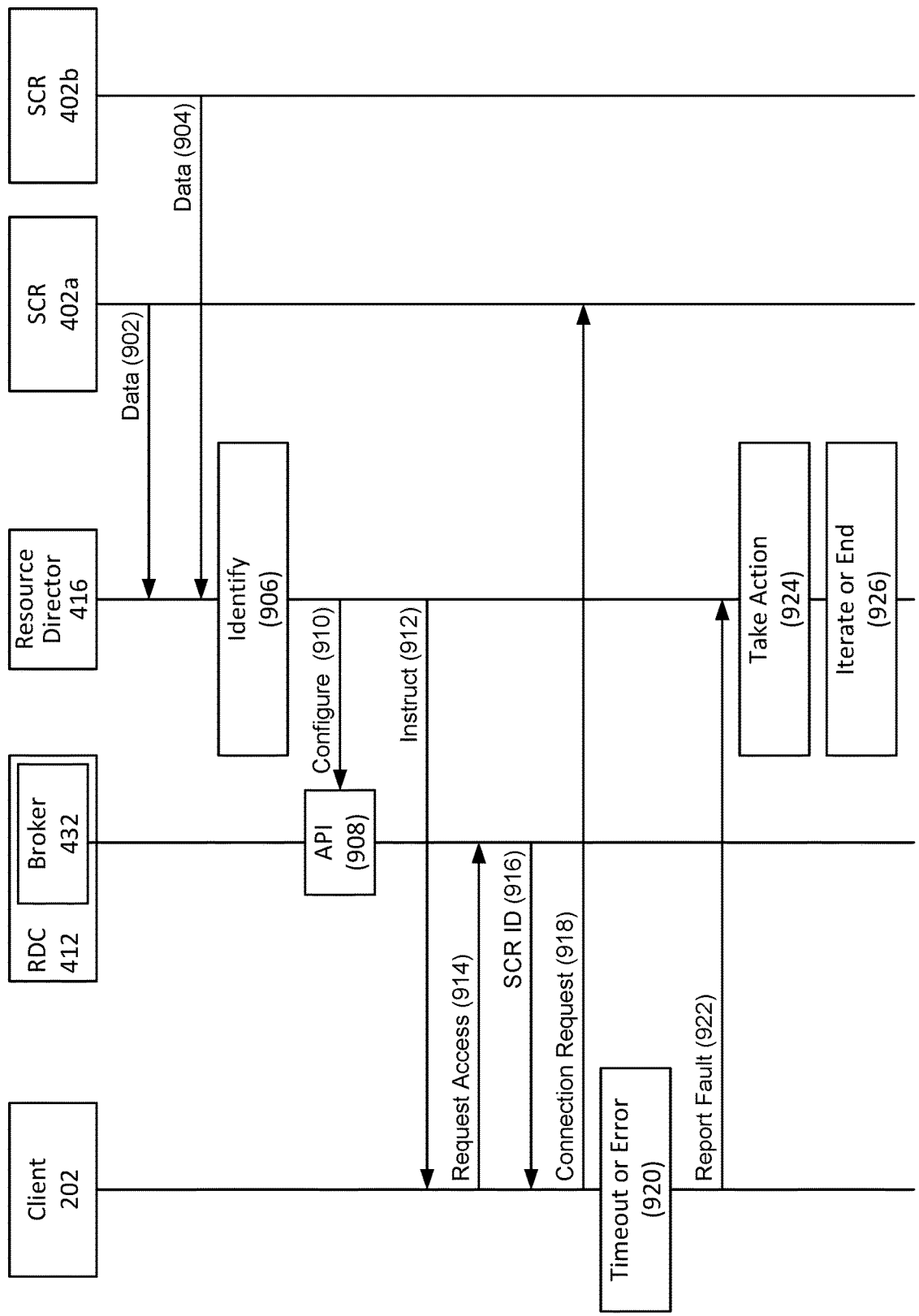

FIGS. 9A and 9B show illustrative signal diagrams according to a third example implementation of the resource delivery system 600 shown in FIG. 6. In this example implementation, the resource delivery system 600 may use an application programming interface (API) exposed by the broker 432 to direct requests for access to certain shared computing resources. In particular, FIGS. 9A and 9B show various communications between the client device 202, the resource delivery controller 412 (including a broker component 432), a resource director 416, and first and second shared computing resources 402a and 402b. As shown, the resource director 416 may collect operational status and/or health data from the first shared computing resource 402*a* (902) and the second shared computing resource 402*b* (904). The resource director 416 may, for example, receive such data from a monitor service associated with the resource delivery controller 412, and/or from a monitor service executing on the shared computing resources 402 themselves. Based on the operational status and/or health data, the resource director 416 may identify (906) one or more shared computing resources 402 to evaluate with the client 202 as previously described in FIG. 1, step 114. For example, the resource director 416 may determine based on the received health data that one or both of the shared computing resources 402 exhibit signs that may indicate that they are faulty. For example, the resource director 416 may interpret a low average CPU load for a shared computing resource 402 combined with a high time variable indicating a time that the shared computing resource 402 has been available as an indication that connections directed to that shared computing resource 402 have not been successful. In this example, the resource director 416 identifies both the first and second shared computing resources 40 as targets for evaluation. The broker 432 may expose an API (908) that the resource director 416 may access to configure the broker 432. The resource director 416 may configure (910) the broker 432 to associate a user identifier corresponding to the client 202 with a shared computing resource identifier corresponding to the first shared computing resource 402*a*. Thus, any request for access containing (or associated with) that user identifier will be directed to the particular shared computing resources 402 associated with that user identifier, even if the other shared computing resources 432 appear to have a lower load and/or more open connections. The resource director 416 may instruct (912) the client 202 to request access to an application hosted by the shared computing resources 402. The client 202 may send, to the resource delivery controller 412, a request for access to an application or service provided by the resource delivery system 600 (914). Based on the user identifier of the requesting client 202, and the configuration previously provided by the resource director 416, the broker 432 may provide the client 202 with identifying information (916) for the particular shared computing resource 402 currently associated with the user identifier (in this case, the first shared computing resource 402*a*). Using the information provided by the broker 432, the client 202 may send a connection request (918) to the first shared computing resource 402*a*. In the example operations shown in FIG. 9A, the first shared computing resource 402*a* either does not respond within a specified time period (timeout), or the client 202 receives some type of error (920). The client 202 may therefore report (922) the faulty shared computing resource 402*a* to the resource director 416. The resource director 416 may take some type of corrective action (924) with regard to the fault, such as by alerting an administrator, logging the fault, or attempting to repair or reboot the first shared computing resource 402*a*. In some implementations, the resource director 416 may identify additional shared computing resources 402 to be evaluated based on features of the faulty first shared computing resource 402*a* (e.g., software versions or network settings) and/or information about the fault (e.g., error messages received). The resource director 416 may then test additional shared computing resources 402, or may end the evaluations (926).

FIG. 9B shows additional example operations in which the client 202 attempts a connection with the second shared computing resource 402*b* and is successful. The additional operations may be a continuation of the operations of FIG. 9A or may occur during overlapping time periods; that is, preceding some of the operations of FIG. 9A. As shown, the broker 432 may expose the API (940), which the resource director 416 may access to configure the broker 432. The resource director 416 may configure (942) the broker 432 to associate a user identifier corresponding to the client 202 with a shared computing resource identifier corresponding to the second shared computing resource 402*b*. Thus, any request for access containing (or associated with) that user identifier will be directed to the second shared computing resource 402*b*, even if other shared computing resources 432 appear to have a lower load and/or more open connections. The resource director 416 may instruct (944) the client 202 to request access to an application hosted by the shared computing resources 402. In some implementations, probing of multiple shared computing resources 402 may occur in parallel; for example, using multiple client devices 202. The client 202 may send another request for access (946) to the resource delivery controller 412. Based on the user identifier of the requesting client 202, and the configuration previously provided by the resource director 416, the broker 432 may provide the client 202 with identifying information (948) for the particular shared computing resource 402 currently associated with the user identifier (in this case, the second shared computing resource 402*b*). Using the information provided by the broker 432, the client 202 may send a connection request (950) to the second shared computing resource 402*b*. In the example operations shown in FIG. 9B, the second shared computing resource 402*b* responds with a connection response (952), and thus appears to be functioning normally. The client 202 may establish the connection (954) with the second shared computing resource 402*b*. The client 202 may therefore report (956) to the resource director 416 that the second shared computing resource 402*b* is not faulty. The resource director 416 may log the results (958) of the evaluation. The resource director 416 may then test additional shared computing resources 402, or may end the evaluations (960).

G. Example Implementations of Methods, Systems, and Computer-Readable Media in Accordance with the Present Disclosure The following paragraphs (M1) through (M21) describe examples of methods that may be implemented in accordance with the present disclosure.

(M1) A method may involve determining, by a computing system, that at least a first shared computing resource managed by a controller is potentially faulty; configuring, by the computing system, the controller such that, in response to a client device requesting access to a first application during a first time frame, the controller selects the first shared computing resource to attempt to deliver the first application to the client device; providing, by the computing system, instructions to the client device to access the first application on the first shared computing resource; determining, by the computing system, that the first shared computing resource is faulty based on the client device being unable to access the first application during the first time frame; and taking a corrective action with respect to the first shared computing resource.

(M2) A method may be performed as described in paragraph (M1), and may further involve configuring, by the computing system, the controller such that, in response to the client device requesting access to the first application during a second time frame, the controller selects a second shared computing resource included in the subset to attempt to deliver the first application to the client device; determining, by the computing system, that the client device is able to access the first application during the second time frame; and determining, based at least in part on the client device being able to access the first application during the second time frame, that the second shared computing resource is not faulty.

(M3) A method may be performed as described in paragraph (M1) or paragraph (M2), and may further involve determining, for the plurality of shared computing resources, an average CPU load; determining, for the plurality of shared computing resources, a time variable representing a length of time the shared computing resources have been available; and identifying the subset based at least in part on the average CPU load and the time variable.

(M4) A method may be performed as described in any of paragraphs (M1) through (M3), and may further involve receiving, from the plurality of shared computing resources, health data regarding the shared computing resource; and identifying the subset based at least in part on the health data.

(M5) A method may be performed as described in paragraph (M4), wherein the health data may include one or more of a time elapsed since a last successful connection, a number of current connections, or connection error data.

(M6) A method may be performed as described in any of paragraphs (M1) through (M5), and may further involve sending, by the computing system to the controller, a tag to be associated with the first application and the first shared computing resource; and causing, by the computing system, the client device to include the tag in the first request.

(M7) A method may be performed as described in any of paragraphs (M1) through (M6), wherein configuring the controller may further comprise sending, by the computing system to the controller, first data associating a client device identifier of the client device with a shared computing resource identifier of the first shared computing resource.

(M8) A method may be performed as described in any of paragraphs (M1) through (M7), wherein taking the corrective action may include causing the controller to initiate a reboot of the first shared computing.

(M9) A method may involve identifying, by a computing system, a shared computing resource based on a state of the shared computing resource, the state being indicative of an availability of the shared computing resource to connect with a client device; determining, by the computing system, an amount of time in which the shared computing resource has been in that state; providing, by the computing system, instructions to the client device to connect with the shared computing resource based on the determined amount of time in which the shared computing resource has been in the state; initiating, by the computing system, an action relative to the shared computing resource in response to input from the client device. The input may be indicative of the shared computing resource being inoperative, and the action may be configured to make the shared computing resource operative.

(M10) A method may be performed as described in paragraph (M9), and may further involve identifying, by the computing system, a second shared computing resource; providing, by the computing system, instructions to the client device to connect with the second shared computing resource; and determining, by the computing system in response to input from the client device, that the second shared computing resource is operative.

(M11) A method may be performed as described in paragraph (M9) or paragraph (M10), and may further involve determining, by the computing system, an average CPU load of the first shared computing resource; and providing the instructions to the client device to connect with the shared computing resource additionally based on the average CPU load.

(M12) A method may be performed as described in any of paragraphs (M9) through (M11), wherein initiating the action may include causing the controller to initiate a reboot of the first shared computing.

(M13) A method may involve determining, by a computing system, that at least a first shared computing resource, included among a plurality of shared computing resources managed by a controller, is potentially faulty; configuring, by the computing system, the controller to identify the first shared computing resource with a tag, the tag configured to cause the controller, in response to a client device requesting the controller for access to a first application, to assign the first shared computing resource to deliver the first application to the client device; instructing, by the computing system, the client device to request the controller for access to the first application; determining, by the computing system, that the first shared computing resource is faulty based on the client device being unable to access the first application at a time of application of the tag to the first shared computing resource; and taking a corrective action with respect to the first shared computing resource.

(M14) A method may be performed as described in paragraph (M13), and may further involve configuring, by the computing system, the controller to permit the controller to assign at least one shared computing resource, from among the plurality of shared computing resources, to deliver the first application to the client device.

(M15) A method may be performed as described in paragraph (M13) or paragraph (M14), wherein configuring the controller to assign the at least one shared computing resource to deliver the first application to the client device further comprises: configuring the controller to grant the client device access to a first group of one or more applications, which includes the first application, so that controller is permitted to assign the at least one shared computing resource to deliver the one or more applications to the client device.

(M16) A method may be performed as described in paragraph (M15), and may further involve configuring, by the computing system, the controller to identify the first group of one or more applications with the tag so as to restrict the controller from assignment of the one or more applications to any of the plurality of shared computing resource not identified with the tag.

(M17) A method may be performed as described in paragraph (M15) or paragraph (M16), wherein configuring the controller to associate the client device and the first group of one or more applications further comprises: including an identifier of a probe agent of the client device in a list of devices permitted to access the first group of one or more applications.

(M18) A method may be performed as described in any of paragraphs (M13) through (M17), and may further comprise determining, for the first shared computing resource, at least one of an average CPU load, a memory usage, or a time variable representing a length of time the first shared computing resource has been available, wherein: determining that the first shared computing resource is potentially faulty is based at least in part on the at least one of the average CPU load, the memory usage, or the time variable.

(M19) A method may be performed as described in any of paragraphs (M13) through (M18), and may further comprise receiving, from the first shared computing resource, data regarding the first shared computing resource, wherein: the data includes at least one of a time elapsed since a last successful connection, a number of current connections, or status of a connection, and determining that the first shared computing resource is potentially faulty is based at least in part on the received data.

(M20) A method may be performed as described in any of paragraphs (M13) through (M19), and may further comprise sending the tag to the client device such that the client device includes the tag in requests to the controller for access.

(M21) A method may be performed as described in any of paragraphs (M13) through (M20), wherein taking the corrective action includes causing the controller to initiate a reboot of the first shared computing resource.

The following paragraphs (S1) through (S19) describe examples of systems and devices that may be implemented in accordance with the present disclosure.

(S1) A system may comprise a computing system includes at least one processor and at least one computer-readable medium. The at least one computer-readable medium may be encoded with instructions which, when executed by the at least one processor, cause the computing system to determine, by a computing system, that at least a first shared computing resource managed by a controller is potentially faulty; configure the controller such that, in response to a client device requesting access to a first application during a first time frame, the controller selects the first shared computing resource to attempt to deliver the first application to the client device; provide instructions to the client device to access the first application on the first shared computing resource; determine, that the first shared computing resource is faulty based on the client device being unable to access the first application during the first time frame; and take a corrective action with respect to the first shared computing resource.

(S2) A system may be configured as described in paragraph (S1), wherein the at least one computer-readable medium may be further encoded with additional instructions which, when executed by the at least one processor, further cause the computing system to configure the controller such that, in response to the client device requesting access to the first application during a second time frame, the controller selects a second shared computing resource included in the subset to attempt to deliver the first application to the client device; to determine that the client device is able to access the first application during the second time frame; and to determine, based at least in part on the client device being able to access the first application during the second time frame, that the second shared computing resource is not faulty.

(S3) A system may be configured as described in paragraph (S1) or paragraph (S2), wherein the at least one computer-readable medium may be further encoded with additional instructions which, when executed by the at least one processor, further cause the computing system to determine, for the plurality of shared computing resources, an average CPU load; to determine, for the plurality of shared computing resources, a time variable representing a length of time the shared computing resources have been available; and to identify the subset based at least in part on the average CPU load and the time variable.

(S4) A system may be configured as described in any of paragraphs (S1) through (S3), wherein the at least one computer-readable medium may be further encoded with additional instructions which, when executed by the at least one processor, further cause the computing system to receive, from the plurality of shared computing resources, health data regarding the shared computing resource; and to identify the subset based at least in part on the health data.

(S5) A system may be configured as described in paragraph (S4), wherein the health data may include one or more of a time elapsed since a last successful connection, a number of current connections, or connection error data.

(S6) A system may be configured as described in any of paragraphs (S1) through (S5), wherein the at least one computer-readable medium may be further encoded with additional instructions which, when executed by the at least one processor, further cause the computing system to send, to the controller, a tag to be associated with the first application and the first shared computing resource; and to cause the client device to include the tag in the first request.

(S7) A system may be configured as described in any of paragraphs (S1) through (S6), wherein the at least one computer-readable medium may be further encoded with additional instructions which, when executed by the at least one processor, further cause the computing system to configure the controller at least in part by sending, to the controller, first data associating a client device identifier of the client device with a shared computing resource identifier of the first shared computing resource.

(S8) A system may be configured as described in any of paragraphs (S1) through (S7), wherein the at least one computer-readable medium may be further encoded with additional instructions which, when executed by the at least one processor, further cause the computing system to take the corrective action at least in part by causing the controller to initiate a reboot of first shared computing resource.

(S9) A system may comprise a computing system includes at least one processor and at least one computer-readable medium. The at least one computer-readable medium may be encoded with instructions which, when executed by the at least one processor, cause the computing system to identify a shared computing resource based on a state of the shared computing resource, the state being indicative of an availability of the shared computing resource to connect with a client device; to determine an amount of time in which the shared computing resource has been in that state; to provide first instructions to the client device to connect with the shared computing resource based on the determined amount of time in which the shared computing resource has been in the state; to initiate an action relative to the shared computing resource in response to input from the client device. The input may be indicative of the shared computing resource being inoperative, and the action may be configured to make the shared computing resource operative.

(S10) A system may be configured as described in paragraph (S9), wherein the at least one computer-readable medium may be further encoded with additional instructions which, when executed by the at least one processor, further cause the computing system to identify a second shared computing resource; to provide the first instructions to the client device to connect with the second shared computing resource; and to determine, in response to input from the client device, that the second shared computing resource is operative.

(S11) A system may be configured as described in paragraph (S9) or paragraph (S10), wherein the at least one computer-readable medium may be further encoded with additional instructions which, when executed by the at least one processor, further cause the computing system to determine an average CPU load of the first shared computing resource; and to provide the first instructions to the client device to connect with the shared computing resource additionally based on the average CPU load.

(S12) A system may be configured as described in any of paragraphs (S9) through (S11), wherein the at least one computer-readable medium may be further encoded with additional instructions which, when executed by the at least one processor, further cause the computing system to initiate the action at least in part by causing the controller to initiate a reboot of the first shared computing.

(S13) A system may comprise a computing system includes at least one processor and at least one computer-readable medium. The at least one computer-readable medium may be encoded with instructions which, when executed by the at least one processor, cause the computing system to determine that at least a first shared computing resource managed by a controller is potentially faulty; configuring the controller to associate a client device and a first group of one or more applications so that controller is permitted to assign at least one shared computing resource to deliver the one or more applications in the first group, including at least a first application, to the client device; configure the controller to identify the first group of one or more applications with a tag; configure the controller to identify the first shared computing resource with the tag, the tag configured to indicate that the controller is permitted to assign the first shared computing resource to deliver the one or more applications in the first group to the client device; instruct the client device to request the controller for access to the first application; determine that the first shared computing resource is faulty based on the client device being unable to access the first application at a time of application of the tag to the first shared computing resource; and take a corrective action with respect to the first shared computing resource.

(S14) A system may be configured as described in paragraph (S13), wherein the at least one computer-readable medium may be further encoded with additional instructions which, when executed by the at least one processor, further cause the computing system to determine that at least a second shared computing resource managed by the controller is potentially faulty; configure the controller to identify the second shared computing resource with a tag, the tag configured to indicate that the controller is permitted to assign the second shared computing resource to deliver the one or more applications in the first group to the client device; instruct the client device to request the controller for access to the first application; and determine that the second shared computing resource is not faulty based on the client device being able to access the first application at a time of application of the tag to the second shared computing resource.

(S15) A system may be configured as described in paragraph (S13) or paragraph (S14), wherein the at least one computer-readable medium may be further encoded with additional instructions which, when executed by the at least one processor, further cause the computing system to send the tag to the client device such that the client device includes the tag when requesting the controller for access.

(S16) A system may be configured as described in any of paragraphs (S13) through (S15), wherein the at least one computer-readable medium may be further encoded with additional instructions which, when executed by the at least one processor, further cause the computing system to determine, for the first shared computing resource, at least one of an average CPU load, a memory usage, or a time variable representing a length of time the first shared computing resource has been available; and determine that the first shared computing resource is potentially faulty based at least in part on the at least one of the average CPU load, the memory usage, or the time variable.

(S17) A system may be configured as described in any of paragraphs (S13) through (S16), wherein the at least one computer-readable medium may be further encoded with additional instructions which, when executed by the at least one processor, further cause the computing system to receive, from the first shared computing resource, first data indicative of an operation status of the first shared computing resource; and determine that the first shared computing resource is potentially faulty based at least in part on the first data.

(S18) A system may be configured as described in paragraph (S17), wherein the first data includes at least one of a time elapsed since a last successful connection, a number of current connections, or connection error data.

(S19) A system may be configured as described in any of paragraphs (S13) through (S18), wherein the at least one computer-readable medium may be further encoded with additional instructions which, when executed by the at least one processor, further cause the computing system to take the corrective action at least in part by causing the controller to initiate a reboot of first shared computing resource.

The following paragraphs (CRM1) through (CRM12) describe examples of computer-readable media that may be implemented in accordance with the present disclosure.

(CRM1) At least one non-transitory, computer-readable medium may be encoded with instructions which, when executed by at least one processor included in a computing system, cause the computing system to identify a subset of a plurality of shared computing resources managed by a controller that are to be evaluated using a client device; to configure the controller such that, in response to the client device requesting access to a first application during a first time frame, the controller selects a first shared computing resource included in the subset to attempt to deliver the first application to the client device; to cause the client device to send a first request to access the first application to the controller during the first time frame; to determine that the client device is unable to access the first application during the first time frame; to determine based at least in part on the client device being unable to access the first application during the first time frame, that the first shared computing resource is faulty; and to take a corrective action with respect to the first shared computing resource.

(CRM2) At least one computer-readable medium may be configured as described in paragraph (CRM1), and may be further encoded with additional instructions which, when executed by the at least one processor, further cause the computing system to configure the controller such that, in response to the client device requesting access to the first application during a second time frame, the controller selects a second shared computing resource included in the subset to attempt to deliver the first application to the client device; to determine that the client device is able to access the first application during the second time frame; and to determine, based at least in part on the client device being able to access the first application during the second time frame, that the second shared computing resource is not faulty.

(CRM3) At least one computer-readable medium may be configured as described in paragraph (CRM1) or paragraph (CRM2), and may be further encoded with additional instructions which, when executed by the at least one processor, further cause the computing system to determine, for the plurality of shared computing resources, an average CPU load; to determine, for the plurality of shared computing resources, a time variable representing a length of time the shared computing resources have been available; and to identify the subset based at least in part on the average CPU load and the time variable.

(CRM4) At least one computer-readable medium may be configured as described in any of paragraphs (CRM1) through (CRM3), and may be further encoded with additional instructions which, when executed by the at least one processor, further cause the computing system to receive, from the plurality of shared computing resources, health data regarding the shared computing resource; and to identify the subset based at least in part on the health data.

(CRM5) At least one computer-readable medium may be configured as described in paragraph (CRM4), wherein the health data may include one or more of a time elapsed since a last successful connection, a number of current connections, or connection error data.

(CRM6) At least one computer-readable medium may be configured as described in any of paragraphs (CRM1) through (CRM5), and may be further encoded with additional instructions which, when executed by the at least one processor, further cause the computing system to send, to the controller, a tag to be associated with the first application and the first shared computing resource; and to cause the client device to include the tag in the first request.

(CRM7) At least one computer-readable medium may be configured as described in any of paragraphs (CRM1) through (CRM6), and may be further encoded with additional instructions which, when executed by the at least one processor, further cause the computing system to configure the controller at least in part by sending, to the controller, first data associating a client device identifier of the client device with a shared computing resource identifier of the first shared computing resource.

(CRM8) At least one computer-readable medium may be configured as described in any of paragraphs (CRM1) through (CRM7), and may be further encoded with additional instructions which, when executed by the at least one processor, further cause the computing system to take the corrective action at least in part by causing the controller to initiate a reboot of first shared computing resource.

(CRM9) At least one non-transitory, computer-readable medium may be encoded with instructions which, when executed by at least one processor included in a computing system, cause the computing system to identify a shared computing resource based on a state of the shared computing resource, the state being indicative of an availability of the shared computing resource to connect with a client device; to determine an amount of time in which the shared computing resource has been in that state; to provide first instructions to the client device to connect with the shared computing resource based on the determined amount of time in which the shared computing resource has been in the state; to initiate an action relative to the shared computing resource in response to input from the client device. The input may be indicative of the shared computing resource being inoperative, and the action may be configured to make the shared computing resource operative.

(CRM10) At least one computer-readable medium may be configured as described in paragraph (CRM9), and may be further encoded with additional instructions which, when executed by the at least one processor, further cause the computing system to identify a second shared computing resource; to provide the first instructions to the client device to connect with the second shared computing resource; and to determine, in response to input from the client device, that the second shared computing resource is operative.

(CRM11) At least one computer-readable medium may be configured as described in paragraph (CRM9) or paragraph (CRM10), wherein the at least one computer-readable medium may be further encoded with additional instructions which, when executed by the at least one processor, further cause the computing system to determine an average CPU load of the first shared computing resource; and to provide the first instructions to the client device to connect with the shared computing resource additionally based on the average CPU load.

(CRM12) At least one computer-readable medium may be configured as described in any of paragraphs (CRM9) through (CRM11), and may be further encoded with additional instructions which, when executed by the at least one processor, further cause the computing system to initiate the action at least in part by causing the controller to initiate a reboot of the first shared computing.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining, by a computing system, that at least a first shared computing resource, included among a plurality of shared computing resources managed by a controller, is potentially faulty;
    configuring, by the computing system, the controller to identify the first shared computing resource with a tag, the tag configured to cause the controller, in response to a client device requesting the controller for access to a first application, to assign the first shared computing resource to deliver the first application to the client device;

instructing, by the computing system, the client device to request the controller for access to the first application;

determining, by the computing system, that the first shared computing resource is faulty based on the client device being unable to access the first application at a time of application of the tag to the first shared computing resource; and taking a corrective action with respect to the first shared computing resource; and configuring, by the computing system, the controller to assign at least one shared computing resource, from among the plurality of shared computing resources, to deliver the first application to the client device, including configuring the controller to grant the client device access to a first group of one or more applications, which includes the first application, so that the controller is permitted to assign the at least one shared computing resource to deliver the one or more applications to the client device.

2. The method of claim 1, further comprising:
configuring, by the computing system, the controller to identify the first group of one or more applications with the tag so as to restrict the controller from assignment of the one or more applications to any of the plurality of shared computing resource not identified with the tag.

3. The method of claim 1, wherein configuring the controller to associate the client device and the first group of one or more applications further comprises:
including an identifier of a probe agent of the client device in a list of devices permitted to access the first group of one or more applications.

4. The method of claim 1, further comprising:
determining, for the first shared computing resource, at least one of an average CPU load, a memory usage, or a time variable representing a length of time the first shared computing resource has been available, wherein:
determining that the first shared computing resource is potentially faulty is based at least in part on the at least one of the average CPU load, the memory usage, or the time variable.

5. The method of claim 1, further comprising:
receiving, from the first shared computing resource, data regarding the first shared computing resource, wherein:
the data includes at least one of a time elapsed since a last successful connection, a number of current connections, or status of a connection; and
determining that the first shared computing resource is potentially faulty is based at least in part on the received data.

6. The method of claim 1, further comprising:
sending the tag to the client device such that the client device includes the tag in requests to the controller for access.

7. The method of claim 1, wherein taking the corrective action includes causing the controller to initiate a reboot of the first shared computing resource.

8. A computing system comprising at least one processor and at least one computer-readable medium encoded with instructions which, when executed by the at least one processor, cause the computing system to:
determine that at least a first shared computing resource managed by a controller is potentially faulty;

configuring the controller to associate a client device and a first group of one or more applications so that controller is permitted to assign at least one shared computing resource to deliver the one or more applications in the first group, including at least a first application, to the client device;

configure the controller to identify the first group of one or more applications with a tag;

configure the controller to identify the first shared computing resource with the tag, the tag configured to indicate that the controller is permitted to assign the first shared computing resource to deliver the one or more applications in the first group to the client device;

instruct the client device to request the controller for access to the first application;

determine that the first shared computing resource is faulty based on the client device being unable to access the first application at a time of application of the tag to the first shared computing resource; and take a corrective action with respect to the first shared computing resource.

9. The computing system of claim 8, wherein the at least one computer-readable medium is further encoded with additional instructions which, when executed by the at least one processor, further cause the computing system to:
determine that at least a second shared computing resource managed by the controller is potentially faulty;

configure the controller to identify the second shared computing resource with a tag, the tag configured to indicate that the controller is permitted to assign the second shared computing resource to deliver the one or more applications in the first group to the client device;

instruct the client device to request the controller for access to the first application; and determine that the second shared computing resource is not faulty based on the client device being able to access the first application at a time of application of the tag to the second shared computing resource.

10. The computing system of claim 8, wherein the at least one computer-readable medium is further encoded with additional instructions which, when executed by the at least one processor, further cause the computing system to:
send the tag to the client device such that the client device includes the tag when requesting the controller for access.

11. The computing system of claim 8, wherein the at least one computer-readable medium is further encoded with additional instructions which, when executed by the at least one processor, further cause the computing system to:
determine, for the first shared computing resource, at least one of an average CPU load, a memory usage, or a time variable representing a length of time the first shared computing resource has been available; and determine that the first shared computing resource is potentially faulty based at least in part on the at least one of the average CPU load, the memory usage, or the time variable.

12. The computing system of claim 8, wherein the at least one computer-readable medium is further encoded with additional instructions which, when executed by the at least one processor, further cause the computing system to:
receive, from the first shared computing resource, first data indicative of an operation status of the first shared computing resource; and determine that the first shared computing resource is potentially faulty based at least in part on the first data.

13. The computing system of claim 12, wherein the first data includes at least one of a time elapsed since a last successful connection, a number of current connections, or connection error data.

14. The computing system of claim 8, wherein the at least one computer-readable medium is further encoded with additional instructions which, when executed by the at least one processor further cause the computing system to:
   take the corrective action at least in part by causing the controller to initiate a reboot of first shared computing resource.

* * * * *